(12) United States Patent
Kida

(10) Patent No.: US 11,023,824 B2
(45) Date of Patent: Jun. 1, 2021

(54) CONSTRAINED SAMPLE SELECTION FOR TRAINING MODELS

(71) Applicant: Intel Corporation, Santa Clara, CA (US)

(72) Inventor: Luis Sergio Kida, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 934 days.

(21) Appl. No.: 15/691,632

(22) Filed: Aug. 30, 2017

(65) Prior Publication Data

US 2019/0065989 A1    Feb. 28, 2019

(51) Int. Cl.
| | |
|---|---|
| *G06N 3/08* | (2006.01) |
| *G06N 20/10* | (2019.01) |
| *G06N 3/04* | (2006.01) |
| *G06N 20/00* | (2019.01) |
| *G06F 17/18* | (2006.01) |

(52) U.S. Cl.
CPC ............ *G06N 20/00* (2019.01); *G06F 17/18* (2013.01); *G06N 3/0454* (2013.01); *G06N 3/0481* (2013.01); *G06N 3/08* (2013.01); *G06N 20/10* (2019.01)

(58) Field of Classification Search
CPC .... G06N 3/0481; G06N 3/0454; G06F 17/18; G06F 17/17
USPC ......................................................... 706/12
See application file for complete search history.

(56) References Cited

U.S. PATENT DOCUMENTS

| | | | |
|---|---|---|---|
| 5,809,490 A | | 9/1998 | Guiver et al. |
| 7,792,353 B2* | | 9/2010 | Forman ................. G06N 20/00 |
| | | | 382/159 |
| 2019/0018929 A1* | | 1/2019 | Steingrimsson ... G01N 33/6848 |

FOREIGN PATENT DOCUMENTS

EP          2965053 A1     1/2016

OTHER PUBLICATIONS

Beveridge, J. Ross, et al., "Nov. 1993 Fort Carson RSTA Data Collection Final Report", [Online]. [Accessed Feb. 21, 2018]. Retrieved from the Internet: <URL: http://www.cs.colostate.edu/~vision/publications/1994_fcarson_report.pdf>, (Aug. 5, 1994), 54 pgs.
Kaufman, Jeff, "Detecting Tanks", [Online]. [Accessed Feb. 21, 2018]. Retrieved from the Internet: <URL: https://www.jefftk.com/p/detecting-tanks>, (Dec. 24, 2015), 4 pgs.
Yudkowsky, Eliezer, "Artificial Intelligence as a Positive and Negative Factor in Global Risk", In Global Catastrophic Risks, edited by Nick Bostrom and Milan M. Cirkovic, 308-345., (2008), 46 pgs.

* cited by examiner

*Primary Examiner* — Baboucarr Faal
*Assistant Examiner* — Em N Trieu
(74) *Attorney, Agent, or Firm* — Schwegman Lundberg & Woessner, P.A.

(57) ABSTRACT

Methods, apparatus, and machine-readable mediums are described for selecting a training set from a larger data set. Samples are divided into a training set and a validation set. Each set meets one or more conditions. For each class to be modeled, multiple training sets are created. Models are trained on each of the multiple training sets. A size of samples for each class is determined based upon the trained models. A training data set that includes a number of samples based upon the determined size of samples is created.

25 Claims, 20 Drawing Sheets

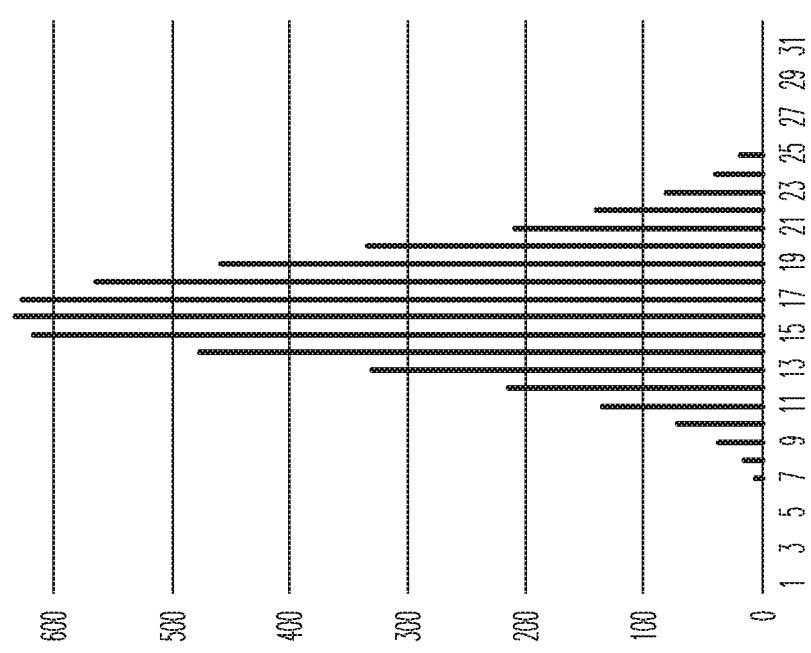

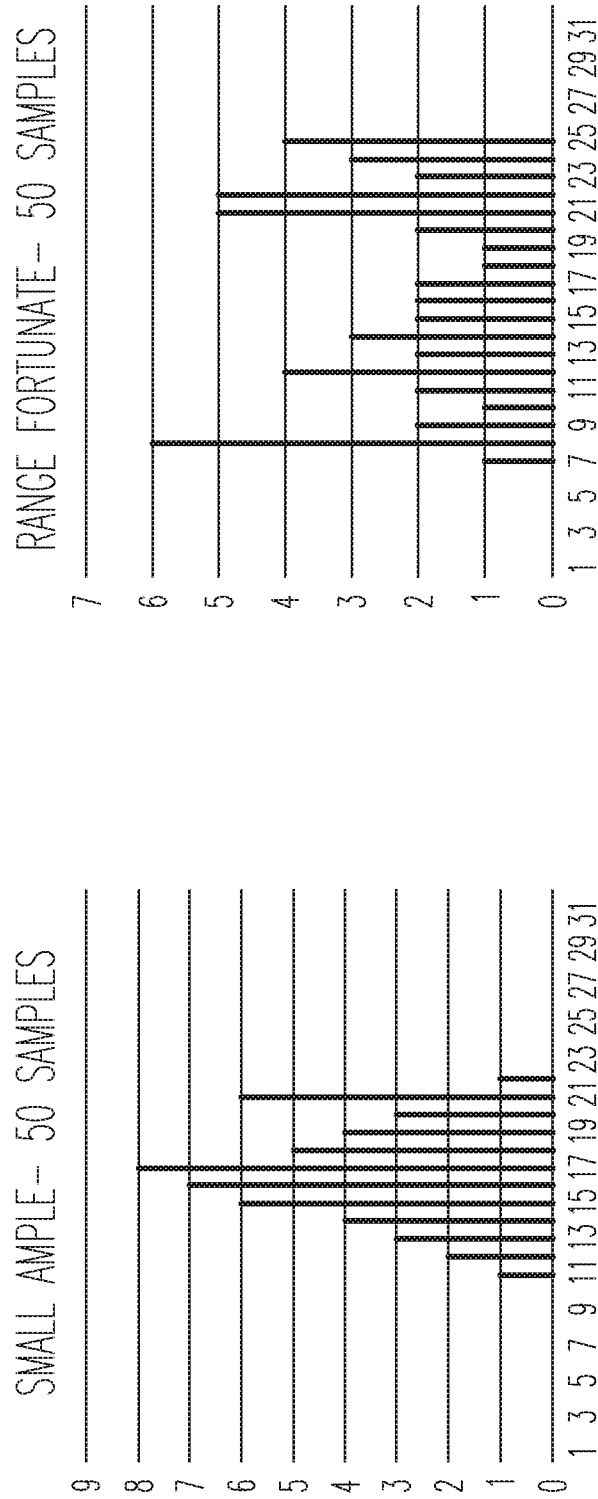

CONSTRAINED SAMPLE SELECTION FOR TRAINING MODELS

TECHNICAL FIELD

Embodiments described herein relate generally to machine learning, specifically to selecting data samples for training and/or testing data sets from a larger data set.

BACKGROUND

With the growth of the Internet of Things (IoT) computation has been moving from the data center to "the edge" to be closer to where the environment is sensed. Some IoT devices attempt to reduce communication bandwidth and to reduce the latency between sensing an event and reacting to the event. Concurrently, machine learning has been growing in importance and popularity because it allows finding hidden insights without explicitly programming the solution.

The combination of both trends towards developing embedded applications with machine learning is limited by IoT devices with little memory and low computation performance compared to computing resources available in data centers and cloud providers. The problem with low computation performance and memory resources of IoT devices is amplified with machine learning algorithms that optimize for correctness without regard for the computation demand and memory footprint of an implementation.

BRIEF DESCRIPTION OF THE DRAWINGS

FIGS. 2A-2I illustrate the distribution of values of one and two properties for a data set of samples and for sampled sub-sets in accordance with some examples.

DETAILED DESCRIPTION

Figure 1:
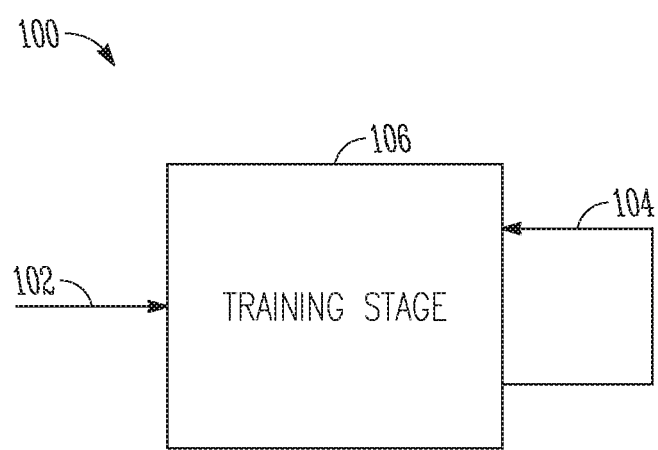
FIG. 1 is a block diagram for training a model.

Reducing the complexity of a classifier model, e.g., a model, a classifier, or a learned classifier, may reduce the memory and computing resources to operate the classifier. The complexity of the model may be reduced by selecting a training data set that is large enough to adequately model the classes to be modeled and no larger. The characteristics of a population to be modeled may be represented by an available data set containing samples from that population. This available data set may be used to select one or more data subsets that also represent the variability of the population, e.g., the available data set has sufficient samples to be split or to have multiple selected, or sampled, data subsets that contain samples that also represent the variation of properties in the samples of the available data set within a degree of similarity. The selected subsets may be used to train a model to predict a target property of the population within an error rate or to test the quality of one such model in modeling the target property.

In addition, the selected data set may include samples from each class that represent the variability of the class of the desired output that is being modeled within a similarity, without including additional data samples. Thus, leading to smaller sampled data sets. In addition, the various subsets created from the available data set may be mutually exclusive on one or more features of the data sets to prevent correlation in the value of some properties of the various subsets to the value of the property that will be modeled. When these various data sets are used for training multiple models, selecting the best performing model, and estimating the performance of the selected model after deployment, they may train a model that is less complex, prevent modeling the mutually exclusive properties, and more accurately estimate the performance of the model.

From the same available data set, one may select one or more data subsets that do not represent the variability of a target property within a similarity level. These unfortunate sampling selections produce data sets that represent a different population and problem than the desired one. Unfortunate sampling may select data sets that do not represent the variability of the desired output within a degree of similarity. From the same initial data set, one may also select one or more data subsets that have more samples than the minimum necessary to represent the variability of a target property. In these examples, the data set contains redundant samples that lead to larger sampled data sets. From the same available data set, one may sample one or more data subsets that contain samples with a feature correlated to the value of the property that will be modeled but the same feature does not correlate for all samples in the available data set or in the population that the model will try to model. These hidden or confounding features could be modeled by a model trained with these data subsets instead of modeling the desired property.

Figure 4:
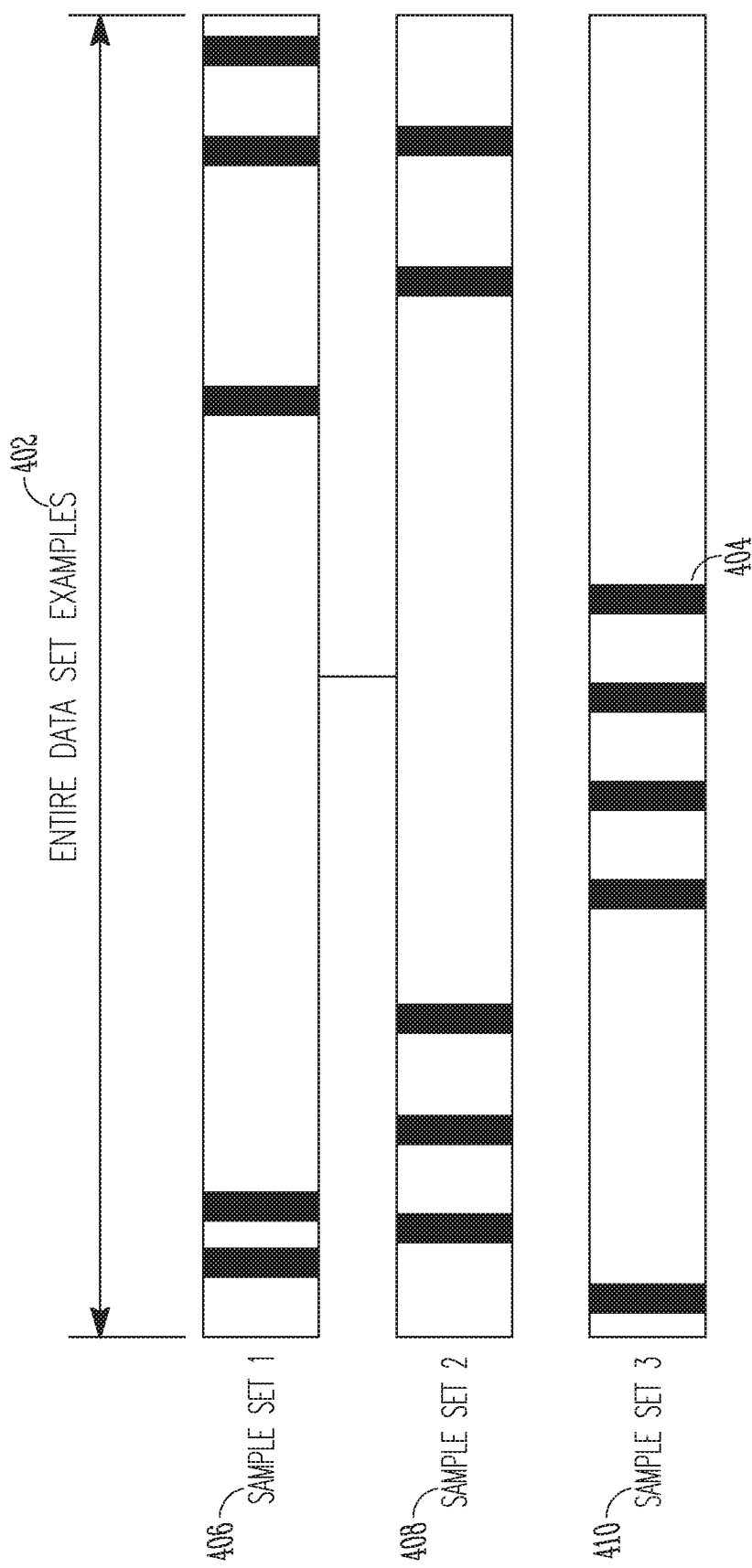
FIG. 4 illustrates selecting samples from a data set in accordance with some examples.

Samples may be selected from a data set in various ways. FIG. 4 illustrates selecting samples from a data set in accordance with some examples. The data set includes a total number of samples 402. From the data set a subset may be selected. A selected sample, e.g., sample 404, is shown as a darkened sample. For example, to create training data subsets of various sizes, an initial training data subset is selected from the total number of samples 402. In an example, the samples may be selected randomly from the entire data set. Samples sets 406, 408, and 410 each illustrate a possible data subset selected by randomly selecting samples. Once the data set is selected, the samples may be analyzed to ensure the data subset meets criteria as described. As described in greater detail below, multiple training data subsets may be created from a larger available data set. These data subsets are used to train, select and estimate performance of various models. Iterating over the multiple data subsets allows a model to be created that has a desired accuracy or sensitivity and complexity of implementation.

FIG. 1 is a block diagram 100 for training a model. A body of data may be used to train and validate a classifier or model. The data includes numerous samples, each sample includes various features of an item that may be classified into one of many classes. The various features may be in the form of a vector of values, which each value representing a property of the item. As an example, the data set may include samples of items that are either a house or a boat. Each sample may be a vector contain various features of the item that are used to classify the item as a boat or a house. A subset of the data may be used as training data to train a model to classify a sample. The training data is labeled, meaning each sample in the training data includes the sample's correct class. Another subset of the data may be used to test the model to estimate the performance of the selected model. The testing data set is also labeled with each sample's known class. The testing data may be used to estimate the performance of the model.

Sensitivity and accuracy are two ways to measure the performance of a model. Accuracy measures how many samples a model correctly classifies. Accordingly, a model that classifies 67 out of 100 samples correctly will have a 67% accuracy. Accuracy, however, does not measure the quality of the model in classification of different classes. Sensitivity measures how many of the model's classification to a class were correct. Continuing the same example, if the model is tested with 60 samples of class A; 30 samples of class B; and 10 samples of class C, sensitivity measures how many of the samples of each class were classified to the correct class. For this example, if the 48 samples of class A were correctly classified; 15 samples of class B were correctly classified; and 4 samples of class C were correctly classified the sensitivity would be 80% for class A, 50% for class and 40% for class C. Sensitivity, therefore, is measured on a per class basis. The average of the sensitivity of the classes may be used to gauge the performance of a model. When the number of samples of each class; the support of the class, is the same, the accuracy and the mean sensitivity have the same value. In an example, the average sensitivity over all classes is used to measure the performance of a model. Using the average sensitivity of the three class in the above example, the average sensitivity would be ~57%. In the discussion below, a model may be ranked or validated based upon either or both the accuracy or mean sensitivity of the model or other quality metric.

The performance of a learned model is impacted by the quality and amount of training data. In addition, the amount of training data impacts the computational effort needed for training, the complexity of the trained model as well as the computational power consumed by the deployed model while classifying samples. Further, the samples of a particular class selected to train the model may not represent the diversity of features present in all the samples of that particular class, the samples may under represent the class. Training a model with insufficient sample number and variety to represent the problem limits the quality of the model. Some training data subsets may need additional samples of a certain class to be able to accurately classify samples belonging to that class. In addition, when a model is tested with insufficient variability in the testing data, the quality of the model may be incorrectly estimated. In addition, randomly selecting samples for the testing data set may lead to a testing data set that over represents or under represents a particular class. Another possible problem arises when a training data set contains a hidden variable or confounding factor that is highly correlated to a desired output only in the data used for training. A hidden variable or confounding factor is a property or set of properties of the samples of data subsets that correctly correlate to the desired output but do not correlate to the desired output in all samples of the target population of the model. A sampled data subset that includes a hidden variable can train and select a model that relies on the hidden variable based on the good correlation of the hidden variable to the correct output. This model will have worse classification results than estimated once deployed because the full population contains samples where the same property does not correlate to the desired classification. For example, a model may be trained to identify a particular object within a picture. A training data subset that includes pictures of an object taken on a sunny day and pictures of other objects taken on non-sunny days, may train a model to differentiate between sunny days and non-sunny days rather than learning to identify the object itself. Operating such a model, therefore, may not identify the object within a picture taken on a non-sunny day and may classify other objects as the object of interest if the picture was taken on a sunny day.

A training data set that represents the variability in the population from which the samples were collected enables training a model that is more accurate and/or sensitive. In addition, training data and validating data that do not contain a hidden variable will also help create more accurate/sensitive models. The table below indicates the various issues that may arise when the training data set, validating data set, and/or test data set have less variability than the true population and/or contain hidden variables.

|  | Training Data Set | Validating Data Set | Test Data Set | Model Implications |
| --- | --- | --- | --- | --- |
| Skewed Training Data | Less variation | Same variation | Same variation | Low Accuracy |
| Skewed Validating Data | Same variation | Less variation | Same variation | Wrong model selected |
| Skewed testing data | Same variation | Same variation | Less variation | Incorrect estimation of accuracy |
| False correlation in training and validation | Data overlap | Data overlap | Independent | Overfit |
| No false correlation | Independent | Independent | Independent | Accurate estimate |

As illustrated above, using training data set that has less variation than the variation of examples in the population, e.g., less variation than the samples from the population that the model will classify once deployed, will create a model with low accuracy. Less variation in the validating and test data sets also lead to selecting the wrong model or incorrectly estimating the accuracy of the model selected will have once deployed. Ideally, all training data subsets have sufficient variation to accurately describe the diversity of the population, and do not have other properties that correlate with the desired output classification only in the training sets. In other words, the samples in the data subsets should not contain samples with a common property that correlates to the correct class in the sampled data set that does not correlate to the correct class in samples outside of the data subsets. When the samples of all training data subsets represent the variation of the population and are free of hidden variables, an accurate model and estimate of performance may be obtained. Use of representative data sets to train a model enables training of a high quality model. The smallest representative dataset may yield less complex and more economical models.

Figure 2C:
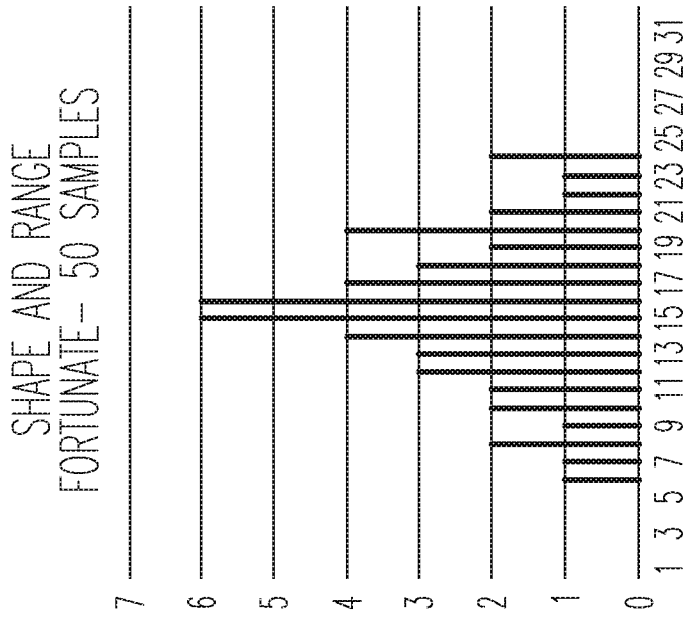
Figure 2D:
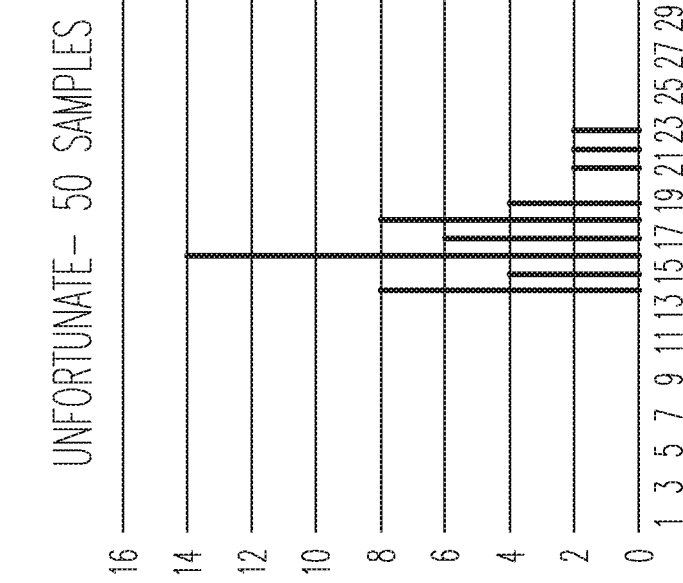
Figure 2C:
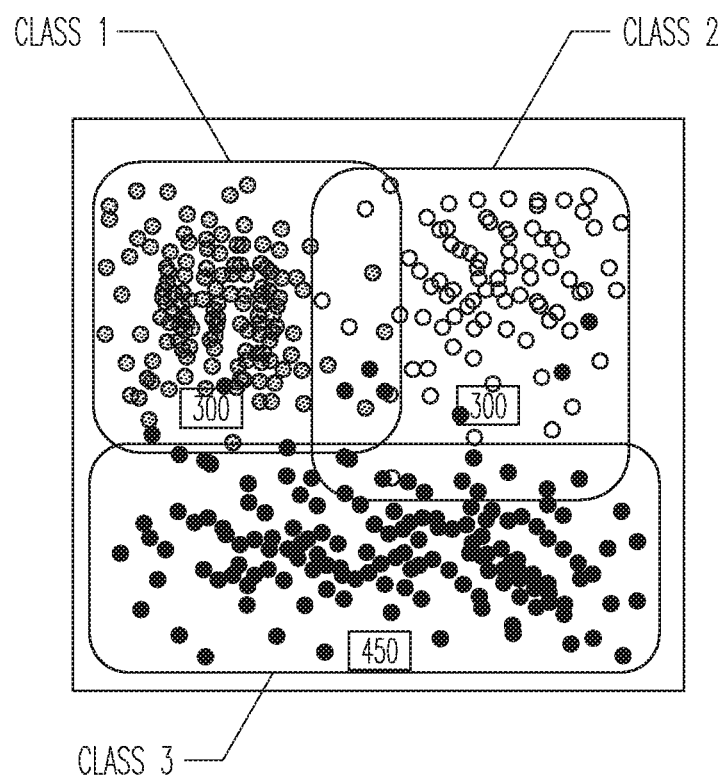

Example subsets are illustrated in FIGS. 2B-2F. FIG. 2A illustrates a histogram of a feature for an available data set of 5000 samples. For the available data set, the value of the feature has a Gaussian (Normal) distribution with mean of 16, standard deviation 3.5 and range 19 with minimum value 7 and maximum value 25. FIG. 2B shows the histogram for a large subset sampled from the available data set with 239 samples. The sampled subset is representative of the distribution of the property with approximately the same mean and standard deviation and comparable range of value to minimum of 9 and maximum of 24. Larger subsets will more often closely represent the distribution of the data set from which it was sampled compared to smaller subsets. FIGS. 2C-2F show the histogram of the same feature for smaller sampled subsets with 50 samples. Randomly selected smaller subsets will more often have properties different from the dataset from which it was sampled when compared to larger randomly selected subsets. The sampled subset of FIG. 2C is not representative of the distribution nor range of values of this feature in the available data set. The range of values for the feature in the sampled subset is from 14 to 23 with no representation of value 20. The sampled subset of FIG. 2D represents the possible variation for this feature in the population with same mean but larger standard deviation. It has the same range of values as the available data from a minimum of 9 to a maximum of 25. The sampled subset of FIG. 2E matches the mean value and standard deviation of the population but does not match the range of values. The sampled subset of FIG. 2F matches the range of values in the available data set, minimum of 7 and maximum of 25. The subset shown in FIG. 2F, however, is not representative of the probability distribution.

Randomly sampled subsets as in FIG. 2B are large to increase the chance the sampled subsets have features that match the dataset from which they were sampled. In an example, small subsets are sampled and subsets that do not match specified properties of features of the available dataset from which the subset was sampled are discarded and only the small sampled subsets that do match specified properties are kept. In another example, the specified properties of the subset match properties different from the properties of the data set from which the subset was sampled. For example, a higher standard deviation, or different mean. For example, a requirement may be for the sampling to have a minimum range of 18 units for the property. The subsets in FIGS. 2D and 2F meet the requirement but samples in the subsets illustrated in FIGS. 2C and 2E do not and would be discarded. In another example, a requirement may be for the subset to match the range and a similar distribution as measured by a standard deviation close to the standard deviation of the available data. The subset in FIG. 2D would meet the requirements but FIG. 2F would not.

Figure 2I:
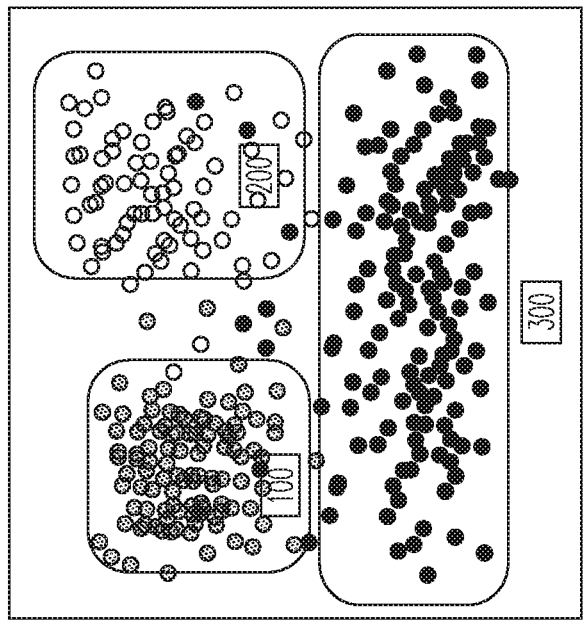
Figure 2H:
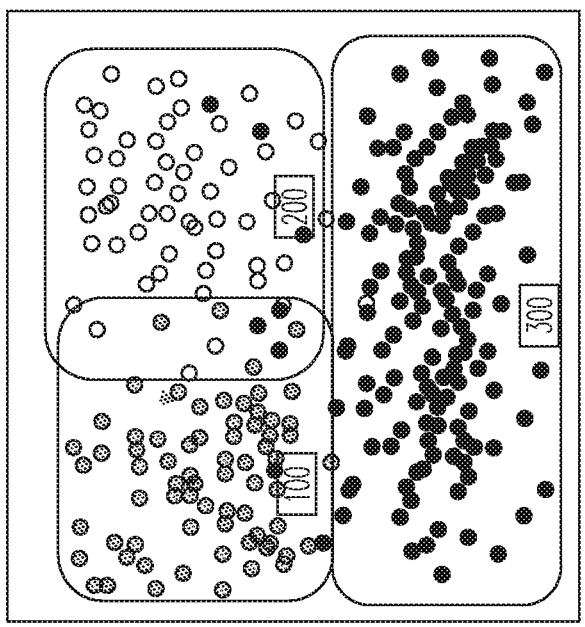

FIG. 2G plots the distribution of the values of 2 properties in the X and Y axis of a data set with 1050 samples with 3 classifications, class 1, class 2, and class 3. FIG. 2H shows a sampled sub-set with 600 samples that preserves the range of values of both properties for each class. FIG. 2I shows a different sampled sub-set with 600 samples that does not preserve the range of values for the two properties for each class.

Figure 5:
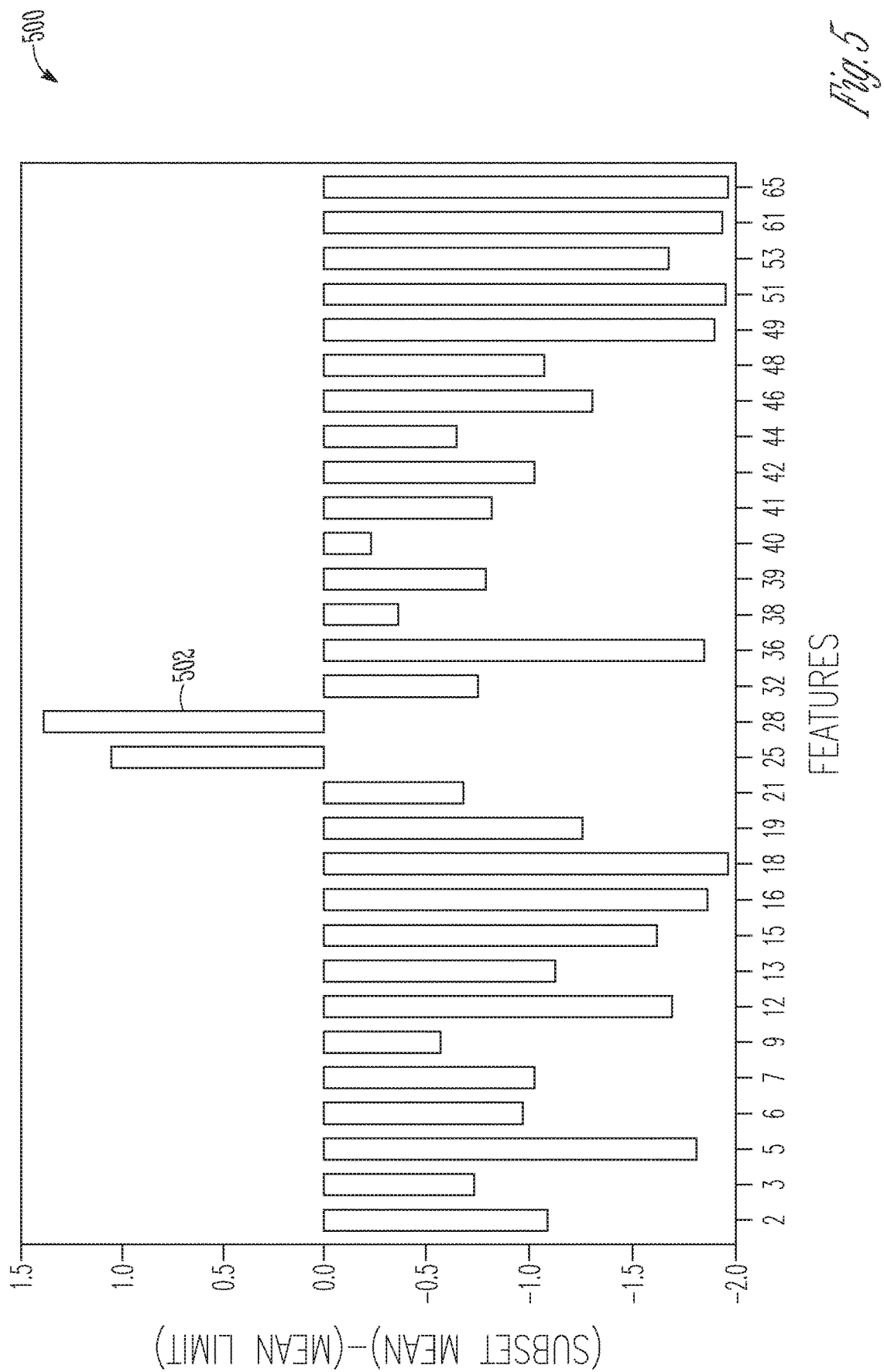
FIG. 5 illustrates differences between properties of samples of a sampled subset relative to the properties of an ideal set for a number of features in accordance with some examples.

The sample data subsets may have various constraints to be similar in various properties of features. In an example, the samples within the data subset have multiple properties such as the mean and/or standard deviation that match the respective features from the entire data set. In an example, how well the features of a selected sampled data subset matches the features of an ideal population or of the full data set from which the subset was sampled may be measured by calculating a distance between the values of the properties represented as a vector. In an example, the distances may be calculated using any of the standard distance norms between vectors such as Lsup or L1 distance norms between the feature vector of the sampled subset and the vector of the desired set and comparing against a distance threshold. One difference between the two ways to calculate the distance is whether a single feature, or characteristic, will disqualify a subset. FIG. 5 plots the difference between the mean of the feature property for the subset, the subset mean, and the target value, in this case the estimated mean for the population, the mean limit, for features selected to control the quality of the sampling identified by a feature ID number on the x-axis, in accordance with some example. For this sampling subset two features of ID 28 and 32 (502) have means that were larger than the target mean. The other properties of the sampled data subset had means smaller than the target. Using Lsup or L1 norm distance to measure the similarity between the property vectors for the sampled subset and the target property emphasizes different aspects of vector differences. Lsup measures the largest difference of any dimension of the vector, the maximum difference in any of the feature means. L1 measures the cumulative difference of all dimensions of the vector. The difference between the different ways to measure the norm is that Lsup detects outliers on any single feature while L1 compares the aggregate difference in all features. A threshold on the distance measured with Lsup norm will discard sampled data subsets that have any property higher or lower than the target by more than the threshold. L1 norm will discard sampled data subsets that have the sum of the absolute differences of all features higher or lower than the target threshold limit.

In various examples, an available data set that describes a physical world and phenomena is sampled into one or more data subsets of a chosen size. In other examples, the available data set is to be split into one or more data subsets. In various examples, the desire is for the data in each of the data subsets to also represent, or describe, some aspect of the physical world and phenomena that is represented in the available data set. The data subset may be created in such a way to ensure that the samples in the subsets meet one or more constraints to ensure a degree of similarity to an ideal data subset that fully describes the population and ensure similarity to each of the other subsets sampled or split from the available data. For example, the samples within one of the two or more data subsets have mean, variance, range, minimum value, maximum value, etc., of features that match those properties (mean, variance, range, minimum, maximum) of a desired population. The properties may be set to match the properties of the available data set or an extrapolation of the intended population from the available data set. For example, the average, e.g., the mean height of subjects in the sampled data set may be required to match the average height of all subjects within the full data set. As another example, multiple properties may be combined to determine the constraints applied to the two or more data sets. For example, the average height and variance of male and female subjects may be required to match within a tolerance the average and variance height of males and females, respectively, in the target population. The data subset may also be checked that the selected samples include samples of females whose average of height are within a tolerance of the average of the available set and a variance height higher than the variance of females in the full available data set. In addition, the number of samples from male subjects and female subjects may be checked such that the samples include samples from both genders in similar proportion or in similar proportion to the available data set. In addition, the minimum height on the sampled data subset may be required to be within 10 cm of the minimum height of the population.

In various examples, one or more properties of the data subsets may be selected to ensure that the two or more data subsets do not have samples with a common value for the one or more properties. The test condition ensures that the data subsets include mutually exclusive values for the one or more properties. For example, the property subject identifier may be used such that samples from one subject only appear in one of the data subsets, or do not appear in more than one subset. There are many features inherent to a subject that could correlate to the desired classification. Training and testing with data subsets that do not share samples from the same subject eliminates the possibility of training the model to classify based upon one of these personal characteristics that do not hold correlation to the desired output in the general population.

The use of smaller data sets that still adequately characterize selected features of a population may lead to reducing the complexity of a classifier model and reducing the cost to train the model. Described above are methods to test that data subsets adequately describe chosen properties by using sampling methods that select data sets that meet chosen conditions for chosen properties of chosen data features that may be used to train a model. An example may use the checking methods described above to sample smaller training subsets to build less complex models using less computational resources, the algorithm will be described in detail later. An example may, before actually training the model that will be deployed, estimate the size and characteristics of an ideal training data subset using the techniques described above to reduce the computational cost to create a less complex deployable model. An example may estimate the smallest number of samples in a subset meeting some characteristics that is capable of training a model that can achieve the desired level of quality. Another example may estimate the achievable quality of a learned model using a set of chosen features and the smallest subset that contains the information available in the larger data set.

The determination of the number of samples of the smallest data set that contains information to train a model that can achieve a desired level of quality may be estimated by an algorithm to determine the smallest number of data samples of each class that can sense the class, or achieve a desired level of quality. The lower bound of achievable quality of the model or upper bound of achievable lowest complexity of the model for a data subset size may be estimated by using computationally inexpensive learning algorithms to train naive models and/or models that don't optimize for complexity. The highest achievable quality, the quality achievable for each training data set size, and the smallest training data set size that can represent the information to achieve a certain quality may be estimated by plotting the estimates of achievable quality as a function of the training set size.

In an example, the estimate of achievable quality as a function of the training set size may be realized by training multiple models with training sets of a given size using a simpler training algorithm to create multiple models and average the quality of the models. In an example, the available samples may be split into two data subsets to be used for training and for testing using the techniques described above to ensure each data subset has samples that satisfy certain conditions. In an example, the conditions may specify characteristics of the data in each subset such as range of values, mean value, etc., for features of the data. In another example, the conditions may also include that specified features have mutually exclusive values between the sets such as samples captured from one subject cannot be in both data subsets. In an example, the two data subsets may have approximately the same number of samples.

In an example, the data sets may contain samples from two or more classes, the required number of samples in the training set may be determined by determining the required number of training samples for each class. To determine the number of samples needed for one specific class the samples may be re-labeled to rename the class of the specific class as the working class and all other samples as other class. For each class the data sets may be decomposed into binary class problems of working and other classes to focus on a single class at a time. The process described below is repeated for each class to determine the number of samples of each class that are needed in the training data.

Figure 3:
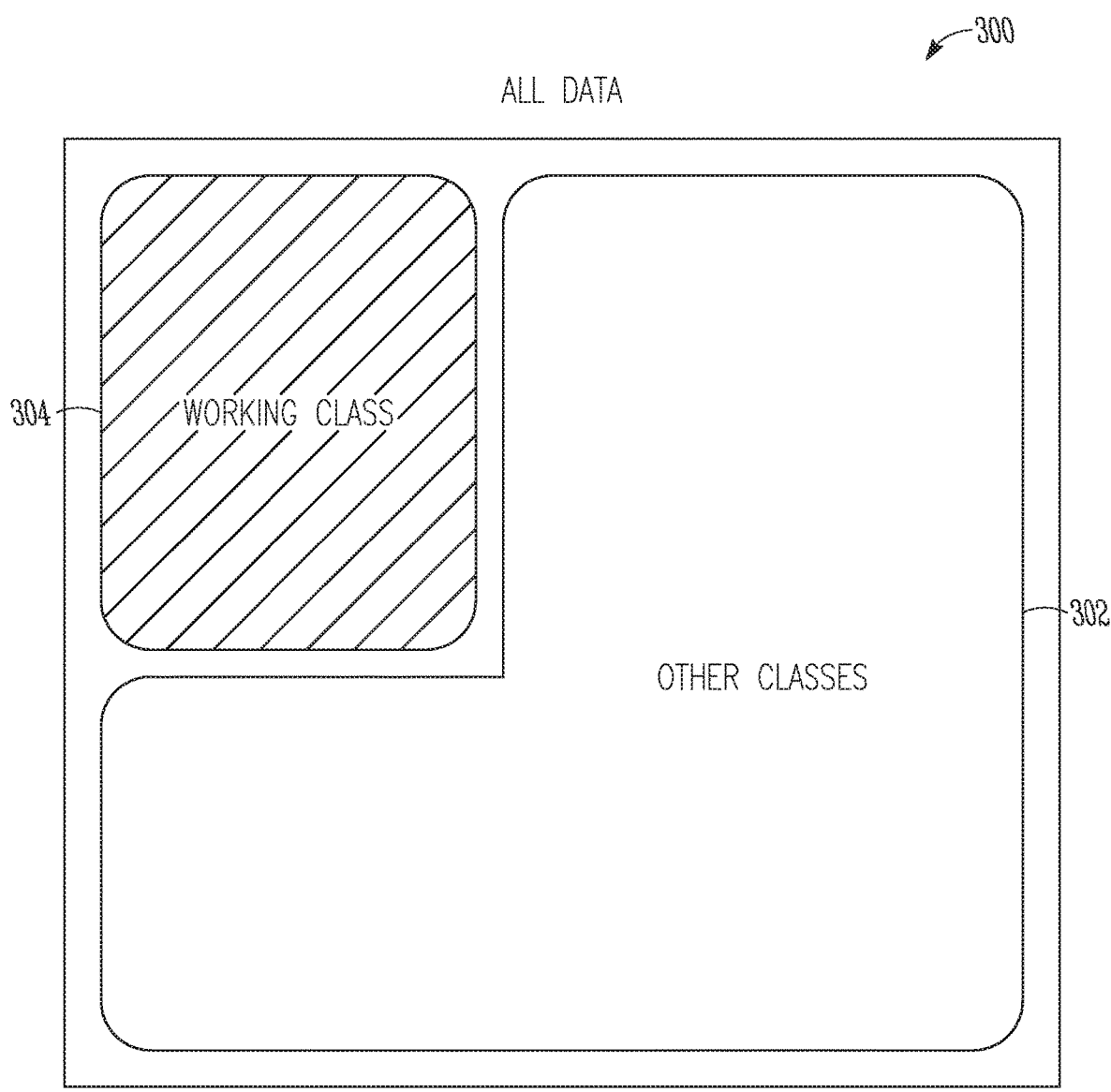
FIG. 3 illustrates a binary decomposition of samples in accordance with some examples.

FIG. 3 illustrates a binary decomposition of samples in accordance with some examples. A graph 300 illustrates the full data set or may illustrate all of the data within one of the data sets created from the full data. The samples are grouped based upon one of the classes assigned to a "working class" class 304 and samples that belong to all other classes assigned to the "other classes" class 302. A working model will be trained to differentiate samples of the working 304 from the samples from all other classes 302. Models will be trained with a varying number of samples from the working class 304 to determine how many samples from the working class 304 are needed to adequately sense the working class 304 in the presence of other classes 302.

Figure 6:
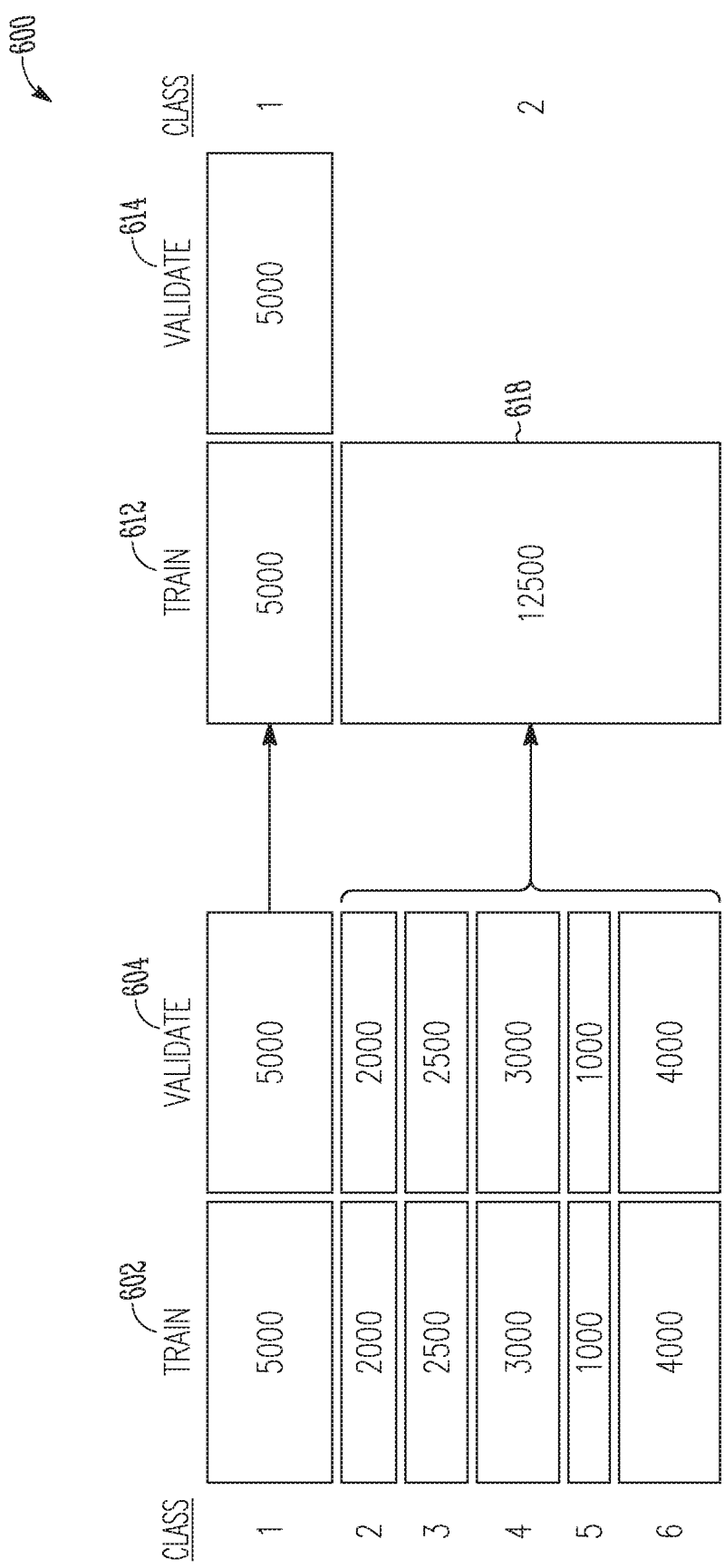
FIG. 6 illustrates mapping training and testing data sets with multiple classes into data sets of two classes in accordance with some examples.

FIG. 6 illustrates a binary decomposition of training and validating samples in accordance with some examples. In FIG. 6, the samples may be classified into one of six classes. The samples from each class are split evenly into a training data set 602 and a validating data set 604. The performance of the model may be measured with one of many quality metrics such as the model's accuracy and/or sensitivity. As noted above, each class is analyzed separately to determine the number of samples in the training subset for that particular class. To analyze a single class, the available data is relabeled to have only two classes. Using these two classes, class 1 is assigned as the working class and classes 2 through 6 assigned to the other class. The training samples are all used as shown in column 612. In this example, validation samples 614 may only use samples of the working class. Using only working class samples saves computation when the performance of the model will be measured with sensitivity which does not require testing of the other class.

Figure 7:
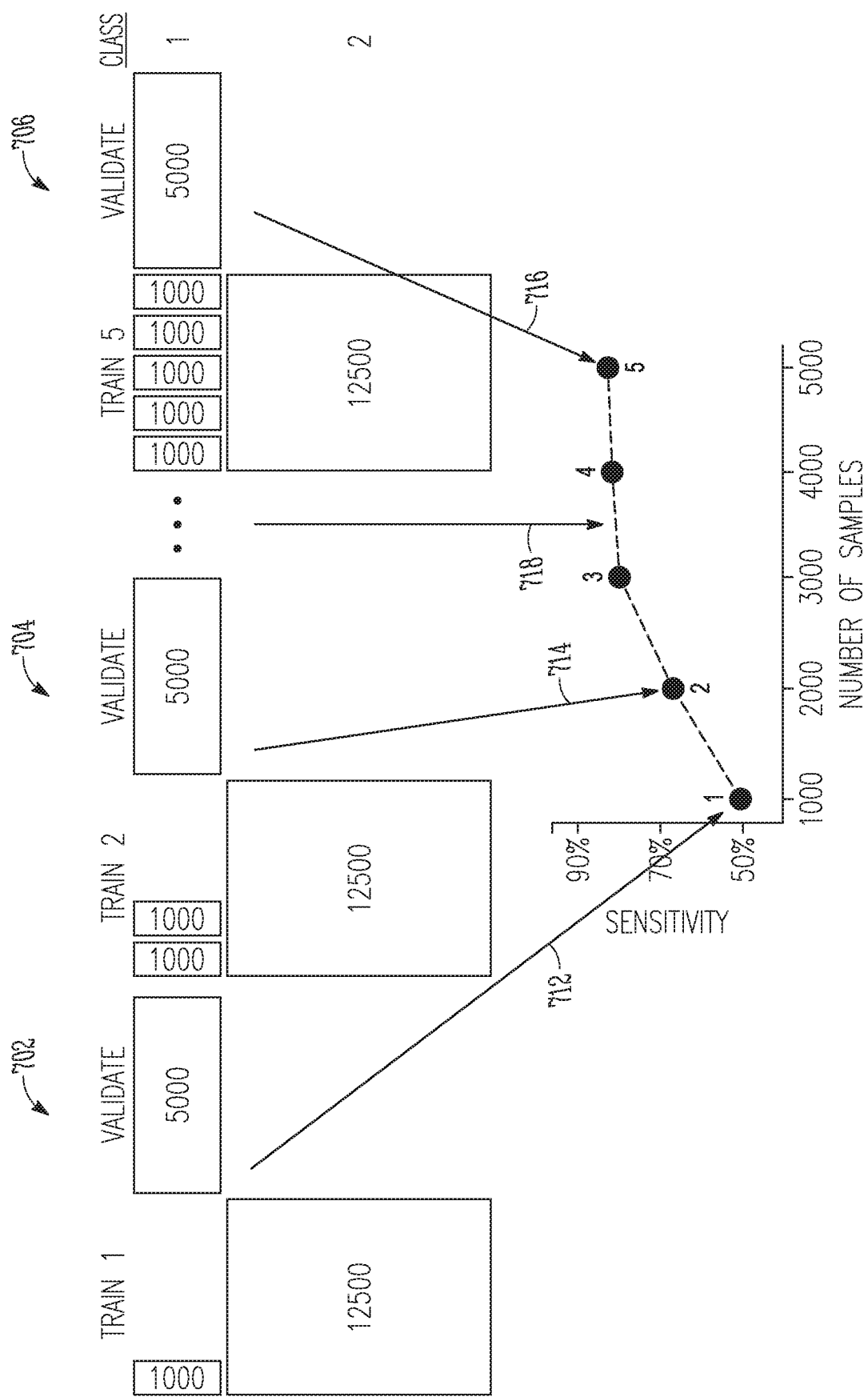
FIG. 7 illustrates increasing the training data set size in accordance with some examples.

Models are trained with data subsets of various number of samples of the working class and a fixed number of samples of the other class and their sensitivity is tested to determine sensitivity that can be achieved with a training data subset with the number of samples of a class. FIG. 7 illustrates increasing the training data set size in accordance with some examples. The sampling and use of the training and validation subsets of different sizes for the Class 1 are shown in FIG. 7. The training and validating data subsets are created as described above in regard to FIG. 6. A first model is trained with a training data subset 702 comprised of the 12,500 samples from other classes and 1,000 samples of the working class sampled from the training data split using the sampling techniques described above to meet requirements of similarity to the ideal training subset and other conditions. Once trained, the performance on the first model 712 is estimated using the validation subset that contains all 5,000 working class samples in the testing subset. As described above, sensitivity to the working class of the various models shown in FIG. 7, is used to estimate performance. Multiple models are trained using a different size training data subset. In an example, the second training subset 704, used the 1,000 samples from the first training subset 702 with the addition of 1,000 additional working class samples that meet the specified properties of the features that were sampled from the remaining samples in the training split using the techniques described above. Additional samples are added to the training data subset, until all working class training data samples are used in training subset 706.

The sensitivity for each trained model may be estimated. The sensitivities for each trained model are graphed in increasing number of training set samples. Points 712, 714, 718, and 716 represent the sensitivity of a model trained with training data sets of increasing sizes that differ only by the addition of working class samples. Initially as the number of samples of the working class in the training data subset increases, the model's sensitivity to the working class also increases. A knee 718, however, may be seen where adding additional samples does not significantly increase the sensitivity of the model. In an example, significantly increase may mean an increase of more than 0.5%, 1%, 1.5%, 2.5%, etc. In FIG. 7, the knee 718 corresponds to a training data set with 3,000 working class samples. Adding additional working class samples, did not significantly increase the sensitivity of the model. Accordingly, in an example, 3,000 samples of class 1 sampled as described may be determined to be sufficient to adequately describe the properties of class 1 for modeling. In another example, an indication of insufficient availability of working class samples may be inferred from the absence of a knee, or inference of continuous increase in sensitivity with increase of working class samples in the training set beyond the number of available samples.

Figure 8:
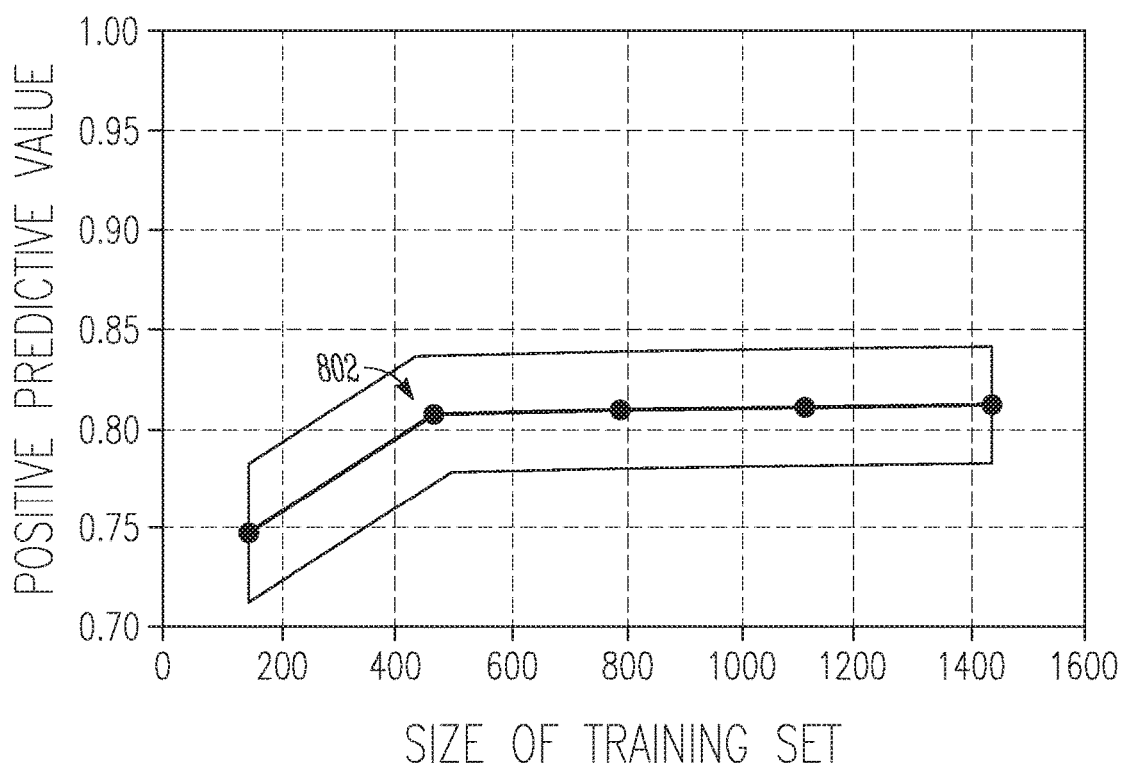
FIG. 8 is an example graph of the sensitivity of a model as a function of the number of samples of a class in the training data set used to create the model in accordance with some examples.

In an example, multiple models may be learned and performance measured for the same number of samples in training data subset to better estimate performance as an average of the quality of the learned models. FIG. 8 is a graph 800 of the positive predictivity of a model and the training data set size used to create the model in accordance with some examples. The graph 800 illustrates the performance estimated as the mean of positive predictivity as a dot and 1 standard deviation of the positive predictivity of the models as a shaded zone surrounding the mean. The number of working class samples in the training data set is indicated by the x-axis. The size increases in increments of roughly 300 samples. The positive predictive value, as indicated on the y-axis, does not significantly increase past the second point 802. In an example, the number of working class samples in the training data needed to represent the working class graphed in FIG. 8 is the number of samples in the training data used in the second training data set. FIG. 8 illustrates a method to estimate a quality metric where multiple testing data sets are sampled and the average of the quality is plotted as the point and the shading around the graphed data points indicates the standard deviation of the scoring value, e.g., the standard deviation of positive predictivity.

The estimate of number of samples sufficient to capture the information needed to sense the working class may be improved with a second iteration of model building and testing. The estimate of the sensitivity of the model to the working class is affected by the number of samples of the other classes in the training subset. In an example, more accurate estimates of achievable sensitivity and sufficient number of samples needed to achieve a desired sensitivity may be estimated by repeating the process with a training set with the number of samples of each class in the non-working set closer to the number of samples that will be contained in the training data set that will be used to train the model that will be deployed. In an example, the minimum number of samples to saturate sensitivity of each of the classes in the other class may be used to more accurately estimate the sensitivity of the working class and reduce computation of the next iteration.

Figure 9:
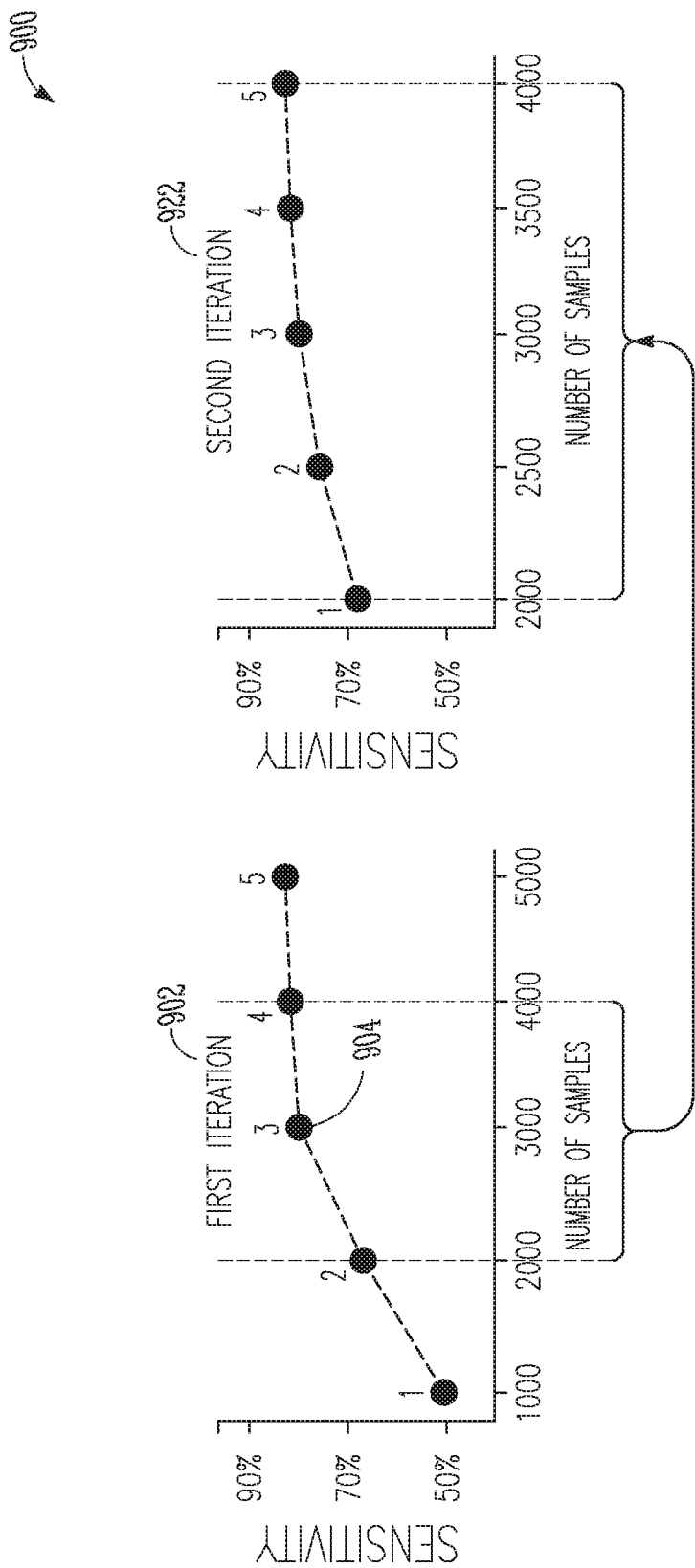
FIG. 9 illustrates graphing the sensitivity as a function of the training data set size for a second iteration within a region in accordance with some examples.

FIG. 9 illustrates the use of a second iteration to refine the estimate of sensitivity and estimate of number of samples sufficient to achieve a certain sensitivity. The first iteration shown in graph 902 corresponds to the sensitivity graph in FIG. 7 using the initial estimate of half the samples of other classes for training. An initial knee 904 is determined to occur when the training data set contains 3,000 samples of the working class. In a second iteration, the number of samples of the other classes in the training subset may be adjusted to match the estimates of the sufficient number of samples needed to achieve a desired sensitivity of the other classes, or adjusted to saturate on sensitivity (knee) of other classes. During the second iteration, the range of number of samples of the working class in the training data subset may be reduced to a range closer to the estimate of the previous iteration to reduce computation and the increments between training subsets to be smaller to improve granularity of estimate when compared to the first iteration. For example, in FIG. 9 the number of working class samples in the training data set starts at 2000 samples and is increased to 4000 samples in 500 samples increments. In addition, in examples that use quality metrics that must test samples from the working class and the other class, the number of samples of each class in the test set used to estimate the quality of the model may be updated to match the estimates of the sufficient number of samples to describe the class to reduce computation. In an example, the validating data set includes a number of samples from each class equal to the class' size to saturate sensitivity determined in the first iteration. In another example, there may be more iterations to further refine the estimates when the estimates of sufficient number of samples per class significantly change when compared to the prior iteration. Significant amount can be, for example, 2.5, 5%, 10%, etc.

The sensitivity for the trained models in the second iteration is illustrated in graph 922. In this example, the starting and ending points for the size of the working class training data set may be selected as the previous and next sizes from the estimate of number of working class training samples selected in the prior iteration (knee) 904. In another example, the selection of the starting and ending training data set sizes may be set based upon a range of sensitivity from the knee point's sensitivity value. For example, the size of the training data set size that has a sensitivity of 5% less than the knee's sensitivity may be set as the initial training data set size. Conversely, a training data set whose model has a sensitivity of 5% greater than the knee may be selected as the ending training data set size.

After the sensitivity of the various models as a function of the training set size is measured, the number of samples of the particular class to describe the class may be selected. For all training subsets used in training, the number of samples of each class may be chosen to achieve close to the highest achievable sensitivity at a reasonable number of samples, which is the knee point. In other examples, instead of choosing the number of samples at the diminishing gains point, the number of samples of each class for the training subset may be chosen to yield a chosen sensitivity for the classes. For example, the training size may be chosen as the smallest training data set that achieves 85% sensitivity for one particular class and 80% for another particular class. In another example, the same method may be used to check for sufficiency of samples of a given class to characterize the class. If the sensitivity of the models trained with increasing number of samples does not saturate before training with all available samples, this indicates that there are not enough samples of that class in the available data set to represent the variation in the population and more samples are needed. In another example, the same method may be used to check the sufficiency of information in the features to train a model to a desired sensitivity. If the sensitivity of the models saturate below the desired sensitivity, this indicates that the chosen features do not carry sufficient information and/or the learning algorithm is not powerful enough to model to the desired sensitivity and other features and/or algorithms are needed.

Figure 10A:
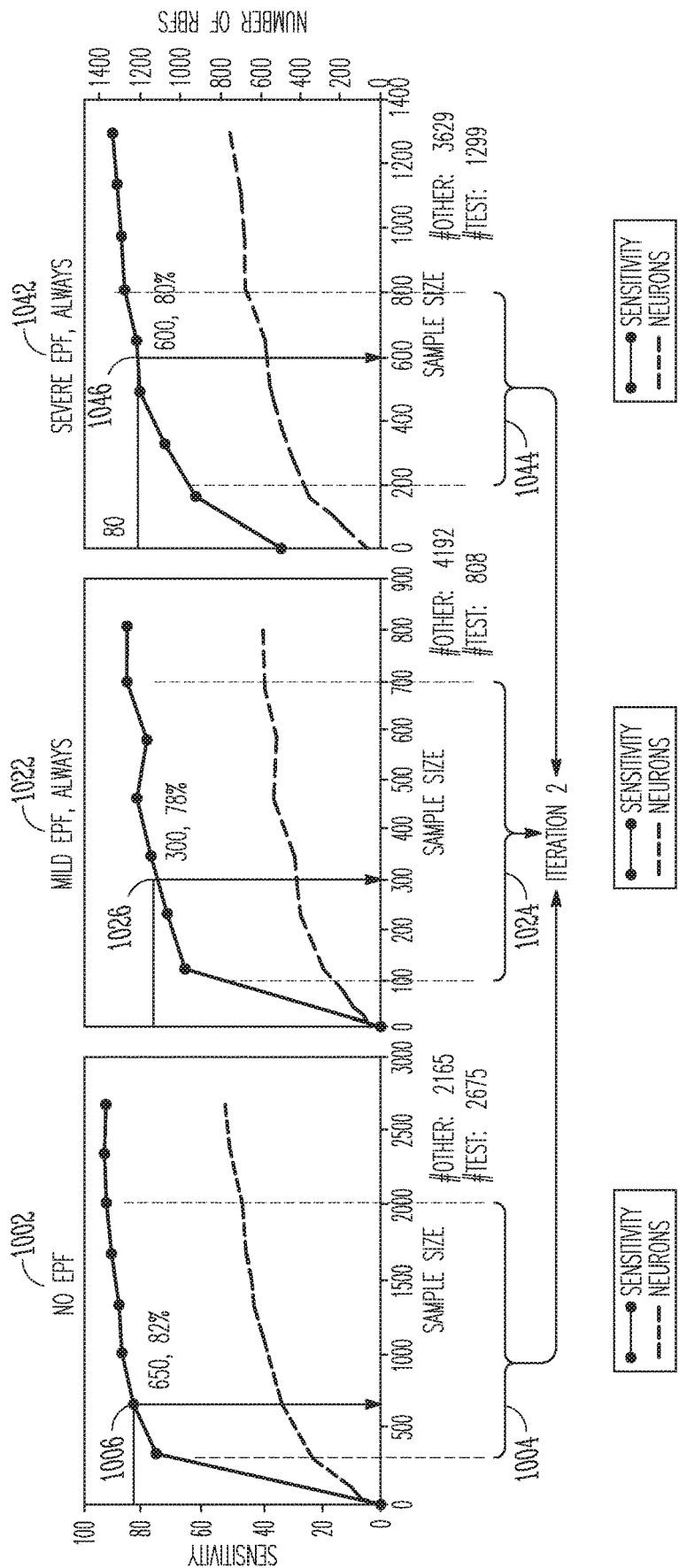
FIGS. 10A-10B illustrate the estimation of number of samples for various classes to represent the information about the classes contained in the available data set and to be able to train to a desired sensitivity in accordance with some examples.

FIG. 10 illustrates another example of determining the ideal number of samples in a training set for various classes in accordance with some examples 1000. In this example, the model will classify the step of a runner according to the flexion of the foot. The samples are labeled into one of three different classes: normal or no Excessive Plantar Flexion (No EPF), mild Excessive Plantar Flexion (mild EN), and severe Excessive Plantar Flection (severe EPF). The available samples are split into training and testing data sets of various different sizes as described above. The training set of each model is comprised of a variable number of samples of the working class in the x-axis and a fixed number of other class samples. The test set is comprised of half the samples of working class reserved for testing. The graphs 1002, 1022, and 1042 plot the sensitivity of models to the working class as a function of the number of working class samples in the training set and also indicate the complexity of the models by plotting the average number of radial basis functions (RBF) (e.g., neurons) in the trained models. Generally, as the number of training samples increases the complexity of the corresponding model also increases, e.g., the number of RBF increases. FIG. 10A graphs 1002, 1022, and 1042 illustrate the first iteration of training a model with training sets with various number of samples of each working class and estimating sensitivity with the test set. The number of samples of each class in the training subset may be chosen to train to a predetermined sensitivity. For example, the number of samples 1006, 1026, 1046 are chosen to train to 90% of the highest sensitivity attained by any of the models, 650 samples of No EPF, 300 samples of Mild EPF, 600 samples of Severe EPF. The number of samples in the training subset may instead be chosen to control the complexity of the model by choosing the number of samples to train a model with desired average number of RBF in the implementation. The range 1004, 1024, and 1044 indicate the ranges of training data samples for a particular class that may be used in a second iteration. The number of samples of each class in the data subsets used to test the models in the next iteration may be chosen to extend from below the number of samples that yield the desired sensitivity or complexity of the model one plans to train up to a number of samples that fully represent the variation of the classes to a certain degree of fidelity as measured by how close it is to the highest sensitivity of any model.

Figure 10B:
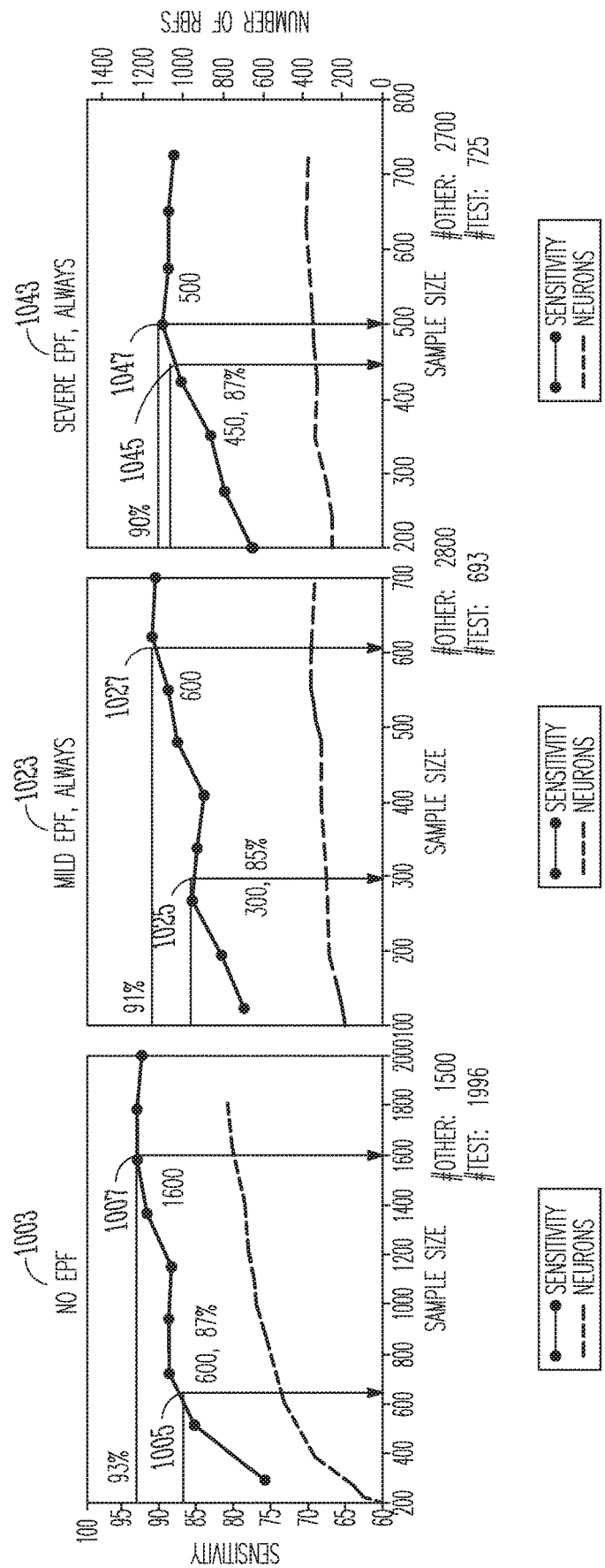

FIG. 10B illustrates the use of a second iteration to improve the estimate of the sensitivity of models trained using the sampling techniques above. Graphs 1003, 1023, and 1043 illustrate the second iteration of sensitivity curves of model trained with training sets comprised of various number of samples of each working class combined with the number of samples of other classes chosen from the curves of the previous iteration estimated to fully represent the variation of the other classes to a certain degree of fidelity tested with a test set with the number of working class samples chosen to fully represent the variation of the working class from the graphs in the prior iteration in FIG. 10A. The number of samples of each class in the training subset to create a model may be chosen from the curves of the second iteration. In an example, the number of samples 1005, 1025, 1045 may be chosen to train to 85% sensitivity, 650 samples of No EPF, 300 samples of Mild EPF, 450 samples of Severe EPF. In another example, the number of samples 1007, 1027, 1047 may be chosen to train to saturation, close to the highest attainable sensitivity, 1600 samples of No EPF, 600 samples of Mild EPF, 500 samples of Severe EPF. The number of samples in the training subset may instead be chosen to control the complexity of the model by choosing the number of samples to train a model with desired average number of RBF in the implementation.

Training of classifier models through learning algorithms may be made more computationally efficient and the results more predictable when the features needed for modeling are learned from data sets that adequately represent the features to the desired degree with the smallest number of samples. Once the size and composition of the smallest sampled subset controlled to represent features has been estimated, the sampling methods described above may be used to create sample sets required by various learning algorithms to train multiple deployable models, select, and estimate performance of the deployable model that meets the quality requirement, is less complex, and is trained in less time. In an example, models may be trained using sophisticated learning algorithms, which are usually computationally expensive, and high computation effort employed to achieve optimal performance and minimum complexity, as opposed to the naïve learning algorithms, which are usually less computationally expensive, and low optimization effort used in the estimation of ideal subset compositions.

Figure 11A:
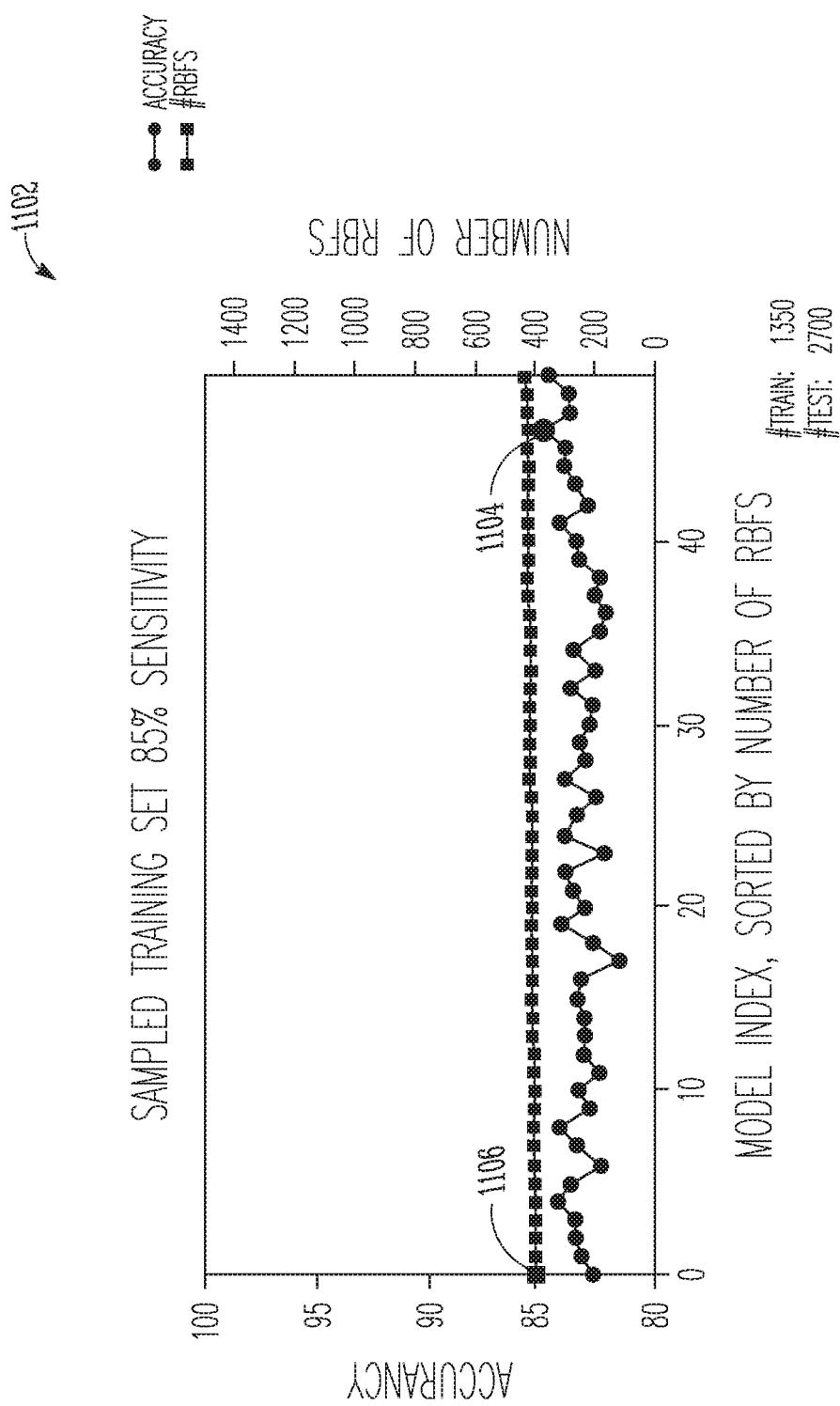
FIG. 11A-11C graphs the sensitivity and complexity of model implementation for various models in accordance with some examples.
Figure 11B:
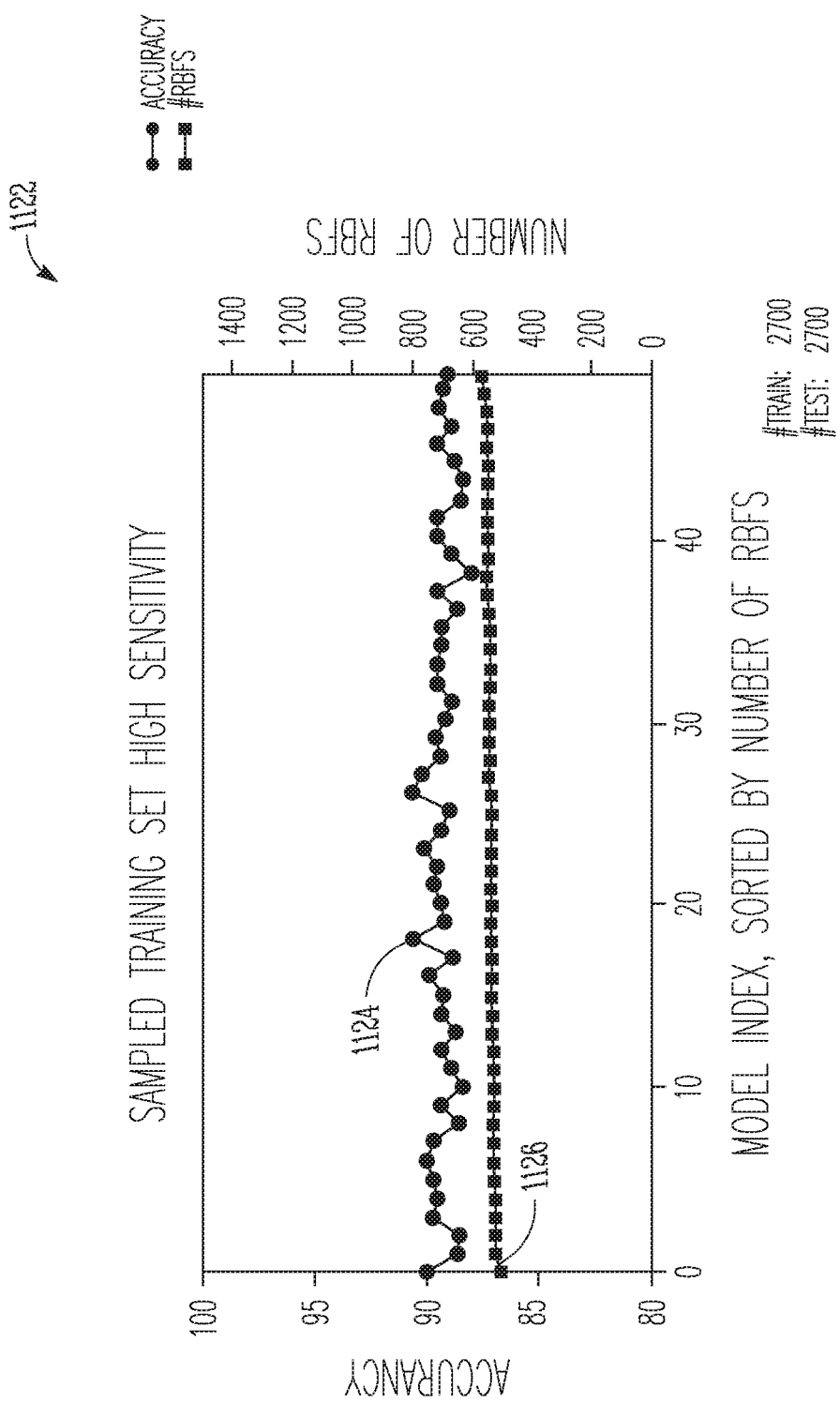
Figure 11C:
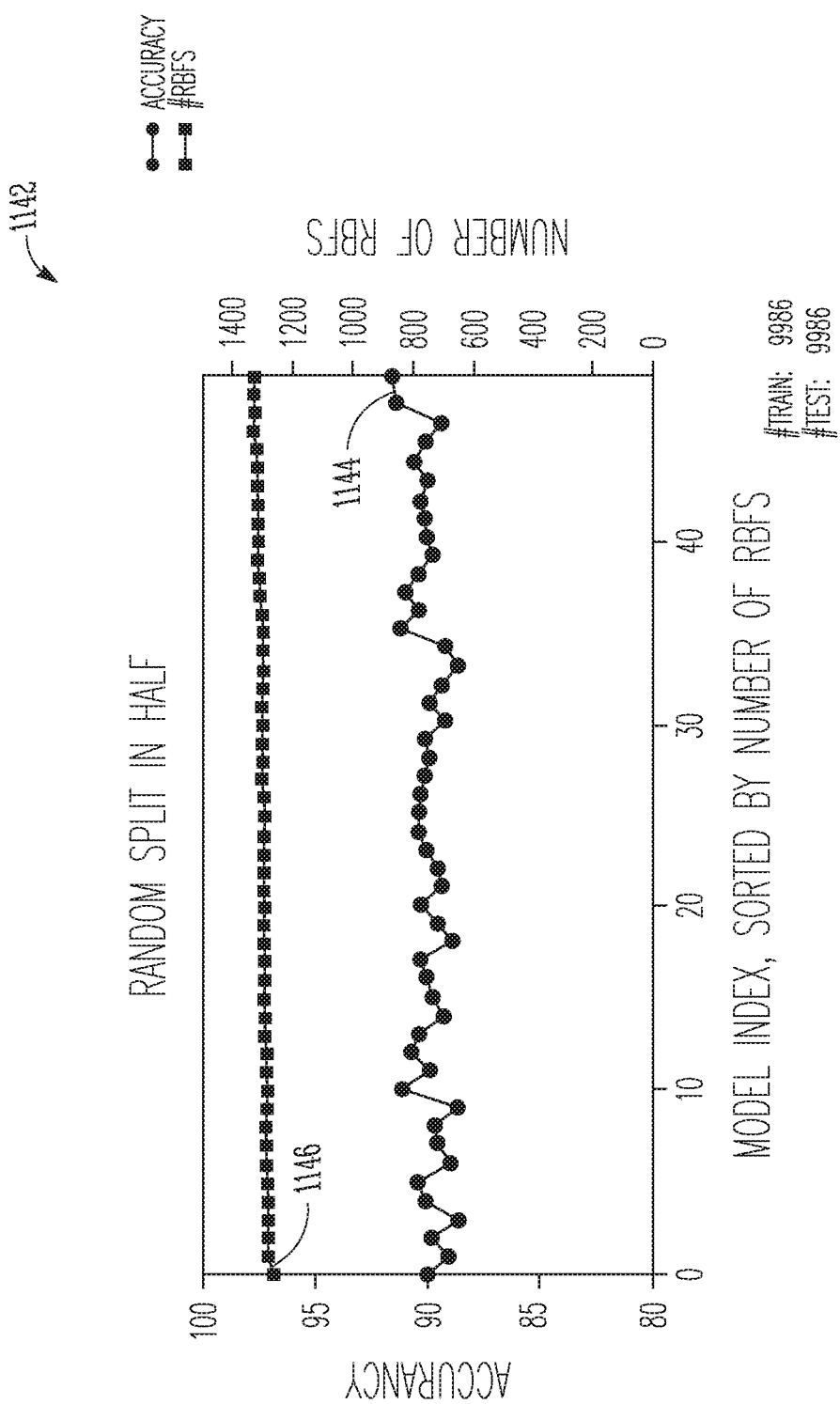

In an example, training data subsets were sampled from the available training data split with feature properties controlled as described above with composition and size of training set with feature properties chosen to achieve 85% sensitivity for each class determined as described above for the classification problem illustrated in FIG. 10B, 600 No EPF, 300 Mild FIT class samples and 450 Severe EPF class samples, to train 50 different models. FIG. 11A illustrates a graph 1102 of the sensitivity and number of IMF for the various models in accordance with some examples. In the graph 1102, fifty models were trained with 1350 training samples sampled from a larger available data set as described above. The training of the models attempted to reach an average sensitivity of 85% at a low computational cost to operate, that is, low complexity. 2700 samples were sampled from a larger dataset reserved for testing as described above to represent the range of data the model would encounter when deployed. It took 82 second to train the 50 models. The most sensitive of these models 1104 reached average sensitivity 85% and was implemented with 422 RBF. While the example in FIG. 10B and FIG. 11A attempted to have equal sensitivity across all three classes, in other examples the sensitivity to one or more classes may be favored. In another example, training data subsets were sampled with feature properties controlled as described above with the composition and size of the training set to train models targeting sensitivities close to the highest attainable sensitivity with a smaller number of samples for the problem described in FIG. 10B, 1600 No EPF, 600 Mild. EPF class samples and 500 Severe EPF class samples. FIG. 1113 illustrates a graph 1122 of the sensitivity and number of RBF for the various models in accordance with some examples. In the graph 1122, fifty models were trained with 2700 training samples sampled from a larger available training data set as described above. The training of the models attempted to reach sensitivity comparable to the sensitivity achievable by training with all available training data at a lower computational cost to operate, that is, models with lower complexity. Twenty seven hundred samples were sampled from a dataset reserved for testing as described above to represent the range of data the model would encounter when deployed. In an example, the 50 models were trained in 183 seconds. The most sensitive of these models reached an average sensitivity of 91% and was implemented with 528 RBFs. In an example, the available data was randomly split into training and test sets of equal size, approximately 10,000 samples each without using the techniques described above, all training samples were used for training and all testing samples were used for testing. FIG. 11C illustrates a graph 1142 of the average sensitivity and number of RBFs for the various models in accordance with some examples. In the graph 1142, fifty models were trained with 10,000 training samples and tested with different 10,000 testing samples. It took 799 second to train the 50 models. The most sensitive of these models reached average sensitivity 92% and was implemented with 1350 RBFs.

|  | Half available (reference) | Saturation Se | 85% Se |
| --- | --- | --- | --- |
| Training samples/ratio | 10K/1 | 2.7K/0.27 | 1.35K/0.14 |
| Test samples/ratio | 10K/1 | 2.7K/0.27 | 2.7K/0.27 |
| Average [Se]/ratio | 92/1 | 91/0.99 | 85/0.92 |
| Complexity [RBF]/ratio | 1350/1 | 528/0.39 | 422/0.31 |
| Compute [s]/ratio | 799/1 | 183/0.23 | 82/0.10 |

The smaller training set reduced the complexity of the models that could be deployed. A model of comparable sensitivity could be implemented with 60% fewer RBF than using current methods. Another advantage of using a reduced training set is the reduction in the time to compute the model by almost 80%. In addition, model complexity and sensitivity can be traded off by selecting the training set size. A reduction of complexity of 70% can be achieved for a model with more than 90% of the achievable sensitivity, 85% sensitivity.

Figure 12A:
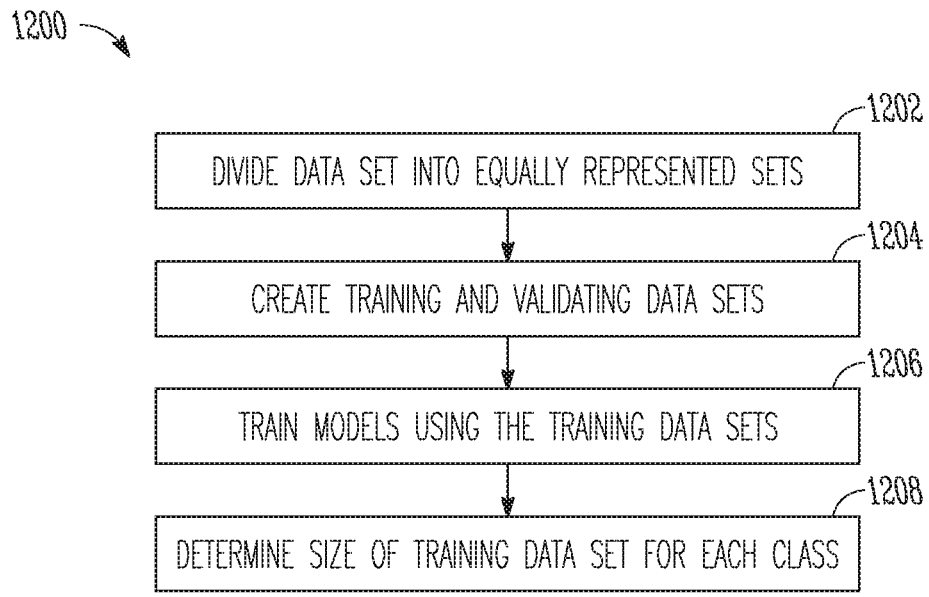
FIG. 12A is a flow diagram for determining the number of samples of each class of a sampled data subset that meet certain criteria in accordance with some examples.

FIG. 12A is a flow diagram for a process 1200 for determining the size and composition of training data in accordance with some examples. The process flow 1200 may be executed on a computing device. At operation 1202, a labeled set of samples is split into two sets. These splits of samples will be used to sample training data subsets and testing data subsets, respectively. In an example, the initial sets may be created by equally distributing the number of samples into the two data splits.

In an example, the two sets share the same statistical properties for one or more features. In an example, the features are relevant for learning a model. For example, the two splits may have samples with a common average, a standard deviation of another property within 10% of a value, and/or another property is within 5% of the full labeled set, etc. Using these constraints that are related to or derived from the available labeled set or from a desired population ensures each split of the dataset model the features to a certain degree. In addition, one or more properties may be selected to ensure that the data sets include samples with different values for one or more features. This ensures that the data sets include mutually, exclusive values for the one or more features and prevent learning those feature and all features correlated to those feature to classify samples. For example, a subject identifier may be used such that samples from one subject only appear in one of the data splits. This eliminates the possibility of training the model to categorize based upon the subject identity or any features and properties inherent to the subject. Preventing learning of the features covered by this condition may allow learning other features relevant to the classes to be modeled.

At operation 1204, training data sets and testing data sets are created from the data splits. In an example, for each class an initial training data set is created using some number of samples less than the total number available. For example, the training data split may include 10,000 samples of a particular class and the sampled training subset may include only 1,000 samples that belong to a particular class. The 1,000 samples may be randomly selected from the training split. The testing data subset may include all of the samples of the particular class from the testing split. The training subset may also include all of the samples in the training split of all other classes. Training subsets and testing subsets are created for each class. In an example, the training subsets may be validated to ensure the training subsets meet various selected requirements. Similar to splitting, or dividing the available data set in 1202, various properties of the samples may be reviewed to ensure that sampled data sets meet certain characteristics. Data sets that do not meet the characteristics may be discarded and another subset sampled until the desired number of subsets meeting the required characteristics are available.

At operation 1206, models are trained using the training subsets. Next, the performance of the models are estimated using the testing subset. Performance may be measured using an average sensitivity across all models. Accuracy or other quality measure may also be used to measure a model's performance.

Operations 1204 and 1206 may be repeated using increasingly larger training data sets. In an example, the previous training data set is expanded by, selecting additional samples that were not previously chosen. The performance of the trained models using various different sized training subsets for each class is determined. At operation 1208, the size and composition of a data set representative of the features controlled may be chosen based on the performance of the corresponding models trained by the training set of that size and composition. Analyzing the performance of the various trained models for each class is used to choose the number of samples for each class that will be included in a representative sampled data set. In an example, the smallest number of samples needed to train a model to reach a particular sensitivity is chosen. In another example, the number of samples is selected based upon reaching a sensitivity within a small difference to the sensitivity of the most sensitive model or based upon reaching a number of samples where increasing the number of samples no longer trains models with higher sensitivity by a certain amount or percentage. In another example, the number of samples is determined based upon not exceeding a complexity of the model.

Figure 12B:
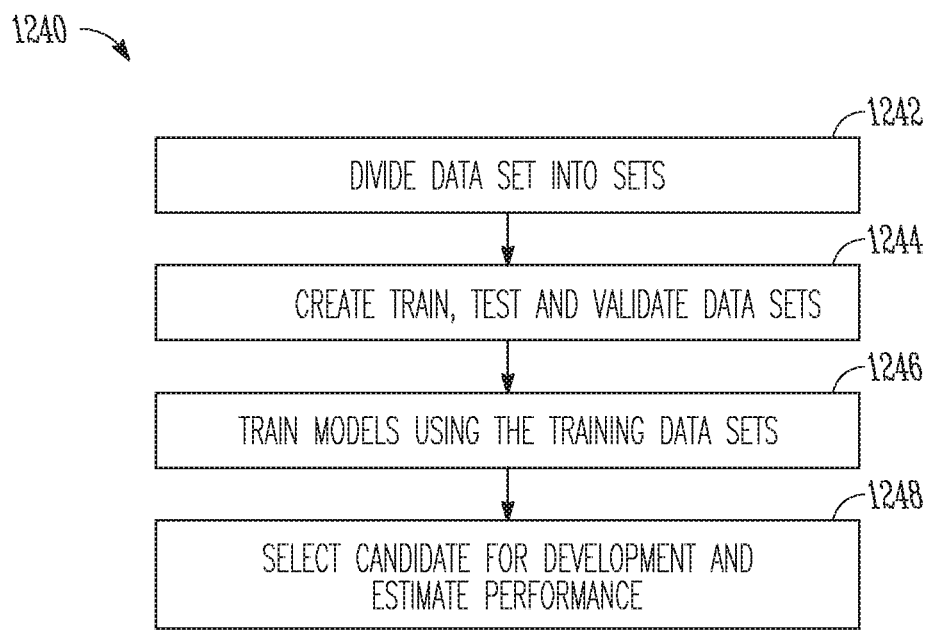
FIG. 12B is a flow diagram to train models using sampled data subsets that meet certain criteria in accordance with some examples.

FIG. 12B is a flow diagram for a process 1240 for training a model leveraging the information on the size and composition of representative sampled data sets determining through the process flow 1200. Process flow 1240 may be executed on a computing device. At operation 1242, a labeled set of samples is split into two or more sets as required by the learning algorithm. In an example, the available data is split into 3 data set splits. These splits of samples will be used to sample training data subsets, validation data subsets, and testing data subsets. In an example, the data splits may be created by distributing the number of samples in numbers proportional to the number of samples consumed by training, validation, and testing by the learning algorithm that will be used to train the models. In addition, the data splits meet statistical property requirements and mutually exclusive property requirements.

At operation 1244, training subsets and validation subsets and testing subsets are sampled from the testing data split and validation data split as required by the learning algorithm. The validation subsets and test subsets meet requirements on certain properties of the samples and are of size and composition as determined in process 1200 to ensure the samples are representative of the total variation of selected features. The training subsets meet requirements on certain properties of the samples and are of size and composition as determined in process 1200 to train models that meet chosen requirements. Data sets that do not meet the respective requirements may be discarded and another subset sampled until the desired number of testing and validation subsets meeting the required characteristics are available.

At operation 1246, multiple models are trained using the training subsets. Learning algorithms may be sophisticated and computationally intensive to achieve high quality and optimize to reduce complexity.

At operation 1248 the performance of each model is estimated by measuring the performance with the validation subset. In another example, the performance may be more accurately estimated by averaging the performance measured with multiple validation subsets. A candidate model may be selected for deployment based on the performance, complexity, and other criteria. In another example, multiple candidate models may be selected. The estimated performance of the model in deployment may be estimated by measuring the performance with the test subset. In another example, the performance may be more accurately estimated by averaging the performance measured with multiple testing subsets.

Selecting samples for a training data set as described above has various advantages compared to randomly selecting samples for the training data set. For example, models trained with training data sets as described above are more likely to achieve the requested performance if the same or more stringent requirement was used to select the composition of the training set and therefore, be candidates for deployment. Random sampling may select training data sets that do not represent the correct diversity in the target population. They may represent less variance than exists on the population. Training models with these randomly selected training data sets results in wasting computation resources to train models that fail to achieve the required performance and therefore, are not candidates for deployment. In addition current methods that randomly select samples may select data subsets with a large number of samples to more often have sufficient numbers of samples of each class. As a result, this sampling may often train a model with more data samples of some classes than is needed. The redundant data and more noisy samples included in the training set may cause a model to over fit to noise and take longer to train and consume more resources to operate. Models that over fit typically are more complex, consume more computing resources, and are not better performing. Random sampling may have a number of samples of a class proportional to the prevalence of the class in the entire data set. This distribution of samples may not be the desired mix of classes to train a model. Selecting a number of samples for each class, as described above, avoids having an undesired mix of classes. Further, the various examples described above allow the expected performance of the model to be estimate in advance and controlled through the composition of the training set. Using the estimated/expected performance, above examples may determine that there are not sufficient samples needed to achieve the desired performance. When this occurs, a warning to an the developer of the model may be provided.

Data sampling for the training data set as described above also may reduce the chance that a model will model confounding or hidden factors. This leads to a more accurate estimation of a model's performance. In addition, the training data sets are selected to match certain properties, e.g., the properties of a target population. Selected training data sets, therefore, are likely to increase the accuracy and reduce the variability of the performance of the models for the target population. In addition, sampled datasets may target different statistical characteristics from the characteristics of the available pool of samples. For example, if it is known that the available data is skewed toward male subjects because the data was collected in an engineering company or the military, the process described above can use the characteristics of a desired population (even distribution of males and females, etc.) to sample data sets that would be more typical samples of a desired population. In addition, the sampling methods above allow targeting of sub populations from the same pool of samples. For example, out of an available data set of runners samples for a particular skill level may be isolated from one another and models specific for one skill level may be created, or for members of the population that run more than 20 miles a week.

Figure 13:
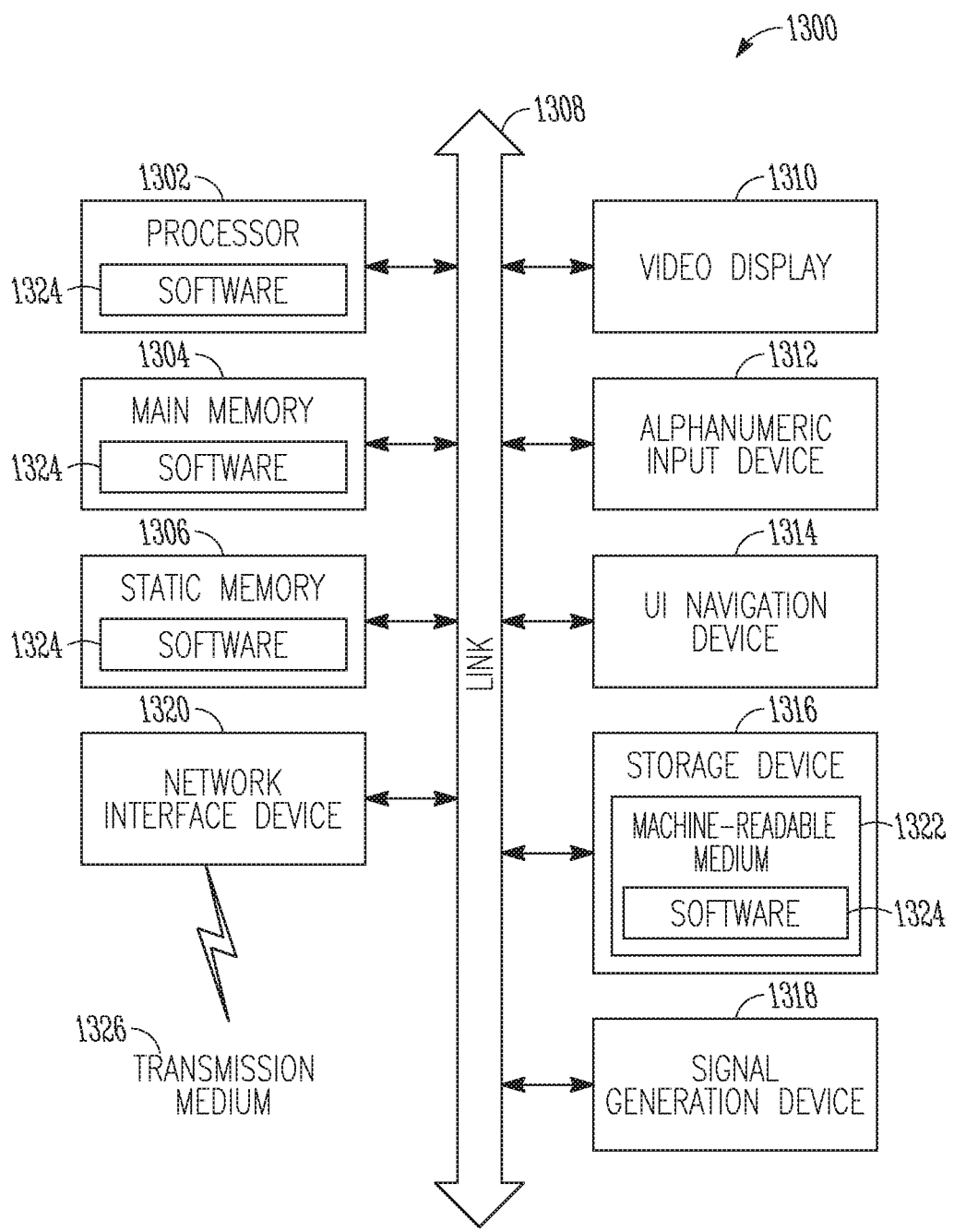
FIG. 13 is an example computing device that may be used in conjunction with the technologies described herein.

FIG. 13 is an example computing device that may be used in conjunction with the technologies described herein. In alternative embodiments, the computing device 1300 may operate as a standalone device or may be connected (e.g., networked) to other computing devices. In a networked deployment, the computing device 1300 may operate in the capacity of a server communication device, a client communication device, or both in server-client network environments. In an example, the computing device 1300 may act as a peer computing device in peer-to-peer (P2P) (or other distributed) network environment. The computing device 1300 may be a personal computer (PC), a tablet PC, a set top box (STB), a personal digital assistant (PDA), a mobile telephone, a smart phone, a web appliance, a network router, switch or bridge, or any computing device capable of executing instructions (sequential or otherwise) that specify actions to be taken by that computing device. Further, while only a single computing device is illustrated, the term "computing device" shall also be taken to include any collection of computing devices that individually or jointly execute a set (or multiple sets) of instructions to perform any one or more of the methodologies discussed herein, such as cloud computing, software as a service (SaaS), other computer cluster configurations.

Computing device 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The computing device 1300 may further include a display unit 1310, an input device 1312 (e.g., a keyboard), and a user interface (UI) navigation device 1314 (e.g., a mouse). In an example, the display unit 1310, input device 1312, and UI navigation device 1314 may be a touch screen display. In an example, the input device 1312 may include a touchscreen, a microphone, a camera (e.g., a panoramic or high-resolution camera), physical keyboard, trackball, or other input devices.

The computing device 1300 may additionally include a storage device (e.g., drive unit) 1316, a signal generation device 1318 (e.g., a speaker, a projection device, or any other type of information output device), a network interface device 1320, and one or more sensors 1321, such as a global positioning system (GPS) sensor, compass, accelerometer, motion detector, or other sensor. The computing device 1300 may include an input/output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.) via one or more input/output ports.

The storage device 1316 may include a computing device (or machine) readable medium 1322, on which is stored one or more sets of data structures or instructions 1324 (e.g., software) embodying or utilized by any one or more of the techniques or functions described herein. In an example, at least a portion of the software may include an operating system and/or one or more applications (or apps) implementing one or more of the functionalities described herein. The instructions 1324 may also reside, completely or at least partially, within the main memory 1304, within the static memory 1306, and/or within the hardware processor 1302 during execution thereof by the computing device 1300. In an example, one or any, combination of the hardware processor 1302, the main memory 1304, the static memory 1306, or the storage device 1316 may constitute computing device (or machine) readable media.

While the computing device readable medium 1322 is illustrated as a single medium, a "computing device readable medium" or "machine-readable medium" may include a single medium or multiple media (e.g., a centralized or distributed database, and/or associated caches and servers) configured to store the one or more instructions 1324.

In an example, a computing device readable medium or machine-readable medium may include any medium that is capable of storing, encoding, or carrying instructions for execution by the computing device 1300 and that cause the computing device 1300 to perform any one or more of the techniques of the present disclosure, or that is capable of storing, encoding or carrying data structures used by or associated with such instructions. Non-limiting computing device readable medium examples may include solid-state memories, and optical and magnetic media. Specific examples of computing device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and optical media disks. In some examples, computing device readable media may include non-transitory computing device readable media. In some examples, computing device readable media may include computing device readable media that is not a transitory propagating signal.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.3 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 1320 may include one or more physical jacks (e.g., Ethernet, coaxial, or phone jacks) or one or more antennas to connect to the communications network 1326. In an example, the network interface device 1320 may include one or more wireless modems, such as a Bluetooth modem, a Wi-fi modem or one or more modems or transceivers operating under any of the communication standards mentioned herein. In an example, the network interface device 1320 may include a plurality of antennas to wirelessly communicate using at least one of single-input multiple-output (SIMO), multiple-input multiple-output (MIMO), or multiple-input single-output (MISO) techniques. In some examples, the network interface device 1320 may wirelessly communicate using Multiple User MIMO techniques. In an example, a transmission medium may include any intangible medium that is capable of storing, encoding or carrying instructions for execution by the computing device 1300, and includes digital or analog communications signals or like communication media to facilitate communication of such software.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

ADDITIONAL NOTES AND EXAMPLES

Example 1 is a system for selecting training set samples, the system comprising: processing circuitry to: divide an initial set of samples into a plurality of comprising at least a training universal set and a validation universal set, the initial set of samples comprising a plurality of samples, each sample comprising a plurality of properties and a class from a plurality of classes; validate each of the plurality of sets meet a condition; for each selected class in the plurality of classes: create a plurality of selected class training sets and an all other classes training set from the training universal set based upon the class of each sample, each of the selected class universal training set comprising samples from the selected class, and the all other classes training set comprising samples from classes that are not the selected class; train a plurality of models; each model trained on one of the selected class training sets and the all other classes training set; and determine a size of a final selected class training set based upon the plurality of models; and provide a final training set that includes samples from each of the plurality of classes that includes for each class a number of samples based upon the size of the final selected class training set for each class.

In Example 2, the subject matter of Example 1 optionally includes wherein the plurality of sets comprise equal representation of each of the plurality of classes.

In Example 3; the subject matter of any one or more of Examples 1-2 optionally include wherein to validate each of the plurality of sets meet the condition the processing circuitry: determines a mean of a property for each of the plurality of sets; and determines the mean of each of the plurality of sets is within a predetermined range, a set is accepted only when the mean is within the predetermined range.

In Example 4, the subject matter of Example 3 optionally includes wherein to validate each of the plurality of sets meet a condition the processing circuitry: determines a standard deviation of a property for each of the plurality of sets; and determines the standard deviation of each of the plurality of sets is within a predetermined range, a set is accepted only when the standard deviation is within the predetermined range.

In Example 5, the subject matter of Example 4 optionally includes wherein to validate each of the plurality of sets meet a condition the processing circuitry determines the samples in each of the plurality of sets each comprise samples of each type of a particular property from a plurality of genders.

In Example 6, the subject matter of any one or more of Examples 1-5 optionally include wherein to divide an initial set of samples into the plurality of sets the processing circuitry: determines samples from a subject has a property value that is the same over all samples from the subject, the samples from the subject are only in one set of the plurality of sets.

In Example 7, the subject matter of any one or more of Examples 1-6 optionally include wherein to create a plurality of selected class training sets the processing circuitry: randomly selects samples from the training universal set; and validates the selected class training set meets the condition.

In Example 8, the subject matter of Example 7 optionally includes wherein to validate the selected class training set meets the condition the processing circuitry: calculates a mean of a property for each of the plurality of sets; and determines the mean of each of the plurality of sets is within a predetermined range, a set is accepted only when the mean is within the predetermined range.

In Example 9, the subject matter of Example 8 optionally includes wherein to validate the selected class training set meets the condition the processing circuitry: calculates a standard deviation of a property for each of the plurality of sets; and determines the standard deviation of each of the plurality of sets is within a predetermined range, a set is accepted only when the standard deviation is within the predetermined range.

In Example 10, the subject matter of any one or more of Examples 7-9 optionally include wherein each successive selected class training set comprises a previous selected class training set, and wherein each successive selected class training set is larger than the previous selected class training set.

In Example 11, the subject flatter of any one or more of Examples 1-10 optionally include wherein to determine the size of the final selected class training set based upon the trained models the processing circuitry: determines a sensitivity value of each of the trained models; and determines a selected model with a smallest number of samples in the selected class training set where other models with larger select class training sets have a sensitivity that is not greater than some threshold, wherein the size of the finalize selected class training set is the size of the selected model.

In Example 12, the subject matter of Example 11 optionally includes wherein to determine the size of the final selected class training set the processing circuitry: creates a second plurality of selected class training sets, a size of each of the second plurality of selected class training sets determined from the size of the selected model; trains a second model on each of the second selected class training sets and the all other classes training set; determines a second sensitivity value of each of the second trained models; and determines a second selected model with a smallest number of samples in the selected class training set where other models with larger select class training sets have a sensitivity that is not greater than some second threshold, wherein the size of the finalize selected class training set is the size of the second selected model.

Example 13 is a method for selecting training set samples, the method comprising: dividing an initial set of samples into plurality of sets comprising at least a training universal set and a validation universal set, the initial set of samples comprising a plurality of samples, each sample comprising a plurality of properties and a class from a plurality of classes; validating each of the plurality of sets meet a condition; for each selected class in the plurality of classes: creating a plurality of selected class training sets and an all other classes training set from the training universal set based upon the class of each sample, each of the selected class universal training set comprises samples from the selected class, and the all other classes training set comprises samples from classes that are not the selected class; training a model on each of the selected class training sets and the all other classes training set; and determining a size of a final selected class training set based upon the trained models; and providing a final training set that includes samples from each of the plurality of classes that includes for each class a number of samples based upon the size of the final selected class training set for each class.

In Example 14, the subject matter of Example 13 optionally includes wherein the plurality of sets comprise equal representation of each of the plurality of classes.

In Example 15, the subject matter of any one or more of Examples 13-14 optionally include wherein the validating each of the plurality of sets meet the condition comprises: determining a mean of a property for each of the plurality of sets; and determining the mean of each of the plurality of sets is within a predetermined range, a set is accepted only when the mean is within the predetermined range.

In Example 16, the subject matter of Example 15 optionally includes wherein to validate each of the plurality of sets meet the condition the processing circuitry: determining a standard deviation of a property for each of the plurality of sets; and determining the standard deviation of each of the plurality of sets is within a predetermined range, a set is accepted only when the standard deviation is within the predetermined range.

In Example 17, the subject matter of Example 16 optionally includes wherein the validating each of the plurality of sets meet the condition comprises determining the samples in each of the plurality of sets each comprise samples of each type of a particular property from a plurality of genders.

In Example 18, the subject matter of any one or more of Examples 13-17 optionally include wherein the dividing an initial set of samples into plurality of sets comprises determining samples from a subject has a property value that is the same over all samples from the subject, the samples from the subject are only in one set of the plurality of sets.

In Example 19, the subject flatter of any one or more of Examples 13-18 optionally include wherein the creating a plurality of selected class training sets comprises: randomly selecting samples from the training universal set; and validating the selected class training set meets the condition.

In Example 20, the subject matter of Example 19 optionally includes wherein the validating the selected class training set meets the condition comprises: calculating a mean of a property for each of the plurality of sets; and determining the mean of each of the plurality of sets is within a predetermined range, a set is accepted only when the mean is within the predetermined range.

In Example 21, the subject matter of Example 20 optionally includes wherein the validating the selected class training set meets the condition comprises: calculating a standard deviation of a property for each of the plurality of sets; and determining the standard deviation of each of the plurality of sets is within a predetermined range, a set is accepted only when the standard deviation is within the predetermined range.

In Example 22, the subject matter of any one or more of Examples 19-21 optionally include wherein each successive selected class training set comprises a previous selected class training set, and wherein each successive selected class training set is larger than the previous selected class training set.

In Example 23, the subject matter of any one or more of Examples 13-22 optionally include wherein the determining the size of the final selected class training set based upon the trained models comprises: determining a sensitivity value of each of the trained models; and determining a selected model with a smallest number of samples in the selected class training set where other models with larger select class training sets have a sensitivity that is not greater than some threshold, wherein the size of the finalize selected class training set is the size of the selected model.

In Example 24, the subject matter of Example 23 optionally includes wherein the determining the size of the final selected class training set comprises: creating a second plurality of selected class training sets, a size of each of the second plurality of selected class training sets determined from the size of the selected model; training a second model on each of the second selected class training sets and the all other classes training set; determining a second sensitivity value of each of the second trained models; and determining a second selected model with a smallest number of samples in the selected class training set where other models with larger select class training sets have a sensitivity that is not greater than some second threshold, wherein the size of the finalize selected class training set is the size of the second selected model.

Example 25 is at least one computer-readable medium, including instructions, which when executed by a machine, cause the machine to perform operations: dividing an initial set of samples into plurality of sets comprising at least a training universal set and a validation universal set, the initial set of samples comprising a plurality of samples, each sample comprising a plurality of properties and a class from a plurality of classes; validating each of the plurality of sets meet a condition; for each selected class in the plurality of classes: creating a plurality of selected class training sets and an all other classes training set from the training universal set based upon the class of each sample, each of the selected class universal training set comprises samples from the selected class, and the all other classes training set comprises samples from classes that are not the selected class; training a model on each of the selected class training sets and the all other classes training set; and determining a size of a final selected class training set based upon the trained models; and providing a final training set that includes samples from each of the plurality of classes that includes for each class a number of samples based upon the size of the final selected class training set for each class.

In Example 26, the subject matter of Example 25 optionally includes wherein the plurality of sets comprise equal representation of each of the plurality of classes.

In Example 27, the subject flatter of any one or more of Examples 25-26 optionally include wherein the validating each of the plurality of sets meet the condition comprises: determining a mean of a property for each of the plurality of sets; and determining the mean of each of the plurality of sets is within a predetermined range, a set is accepted only when the mean is within the predetermined range.

In Example 28, the subject matter of Example 27 optionally includes wherein to validate each of the plurality of sets meet the condition the processing circuitry: determining a standard deviation of a property for each of the plurality of sets; and determining the standard deviation of each of the plurality of sets is within a predetermined range, a set is accepted only when the standard deviation is within the predetermined range.

In Example 29, the subject matter of Example 28 optionally includes wherein the validating each of the plurality of sets meet the condition comprises determining the samples in each of the plurality of sets each comprise samples of each type of a particular property from a plurality of genders.

In Example 30, the subject matter of any one or more of Examples 25-29 optionally include wherein the dividing an initial set of samples into plurality of sets comprises determining samples from a subject has a property value that is the same over all samples from the subject, the samples from the subject are only in one set of the plurality of sets.

In Example 31, the subject matter of any one or more of Examples 25-30 optionally include wherein the creating a plurality of selected class training sets comprises: randomly selecting samples from the training universal set; and validating the selected class training set meets the condition.

In Example 32, the subject matter of Example 31 optionally includes wherein the validating the selected class training set meets the condition comprises: calculating a mean of a property for each of the plurality of sets; and determining the mean of each of the plurality of sets is within a predetermined range, a set is accepted only when the mean is within the predetermined range.

In Example 33, the subject matter of Example 32 optionally includes wherein the validating the selected class training set meets the condition comprises: calculating a standard deviation of a property for each of the plurality of sets; and determining the standard deviation of each of the plurality of sets is within a predetermined range, a set is accepted only when the standard deviation is within the predetermined range.

In Example 34, the subject matter of any one or more of Examples 31-33 optionally include wherein each successive selected class training set comprises a previous selected class training set, and wherein each successive selected class training set is larger than the previous selected class training set.

In Example 35, the subject matter of any one or more of Examples 25-34 optionally include wherein the determining the size of the final selected class training set based upon the trained models comprises: determining a sensitivity value of each of the trained models; and determining a selected model with a smallest number of samples in the selected class training set where other models with larger select class training sets have a sensitivity that is not greater than some threshold, wherein the size of the finalize selected class training set is the size of the selected model.

In Example 36, the subject matter of Example 35 optionally includes wherein the determining the size of the final selected class training set comprises: creating a second plurality of selected class training sets, a size of each of the second plurality of selected class training sets determined from the size of the selected model; training a second model on each of the second selected class training sets and the all other classes training set; determining a second sensitivity, value of each of the second trained models; and determining a second selected model with a smallest number of samples in the selected class training set where other models with larger select class training sets have a sensitivity that is not greater than some second threshold, wherein the size of the finalize selected class training set is the size of the second selected model.

Example 37 is an apparatus for selecting training set samples, the apparatus comprising: means for dividing an initial set of samples into plurality of sets comprising at least a training universal set and a validation universal set, the initial set of samples comprising a plurality of samples, each sample comprising a plurality of properties and a class from a plurality of classes; means for validating each of the plurality of sets meet a condition; for each selected class in the plurality of classes: means for creating a plurality of selected class training sets and an all other classes training set from the training universal set based upon the class of each sample, each of the selected class universal training set comprises samples from the selected class, and the all other classes training set comprises samples from classes that are not the selected class; means for training a model on each of the selected class training sets and the all other classes training set; and means for determining a size of a final selected class training set based upon the trained models; and means for providing a final training set that includes samples from each of the plurality of classes that includes for each class a number of samples based upon the size of the final selected class training set for each class.

In Example 38, the subject matter of Example 37 optionally includes wherein the plurality of sets comprise equal representation of each of the plurality of classes.

In Example 39, the subject matter of any one or more of Examples 37-38 optionally include wherein the validating each of the plurality of sets meet the condition comprises: determining a mean of a property for each of the plurality of sets; and determining the mean of each of the plurality of sets is within a predetermined range, a set is accepted only when the mean is within the predetermined range.

In Example 40, the subject matter of Example 39 optionally includes wherein to validate each of the plurality of sets meet the condition the processing circuitry: determining a standard deviation of a property for each of the plurality of sets; and determining the standard deviation of each of the plurality of sets is within a predetermined range, a set is accepted only when the standard deviation is within the predetermined range.

In Example 41, the subject matter of Example 40 optionally includes wherein the validating each of the plurality of sets meet the condition comprises determining the samples in each of the plurality of sets each comprise samples of each type of a particular property from a plurality of genders.

In Example 42, the subject matter of any one or more of Examples 37-41 optionally include wherein the dividing an initial set of samples into plurality of sets comprises determining samples from a subject has a property value that is the same over all samples from the subject, the samples from the subject are only in one set of the plurality of sets.

In Example 43, the subject matter of any one or more of Examples 37-42 optionally include wherein the creating a plurality of selected class training sets comprises: randomly selecting samples from the training universal set; and validating the selected class training set meets the condition.

In Example 44, the subject matter of Example 43 optionally includes wherein the validating the selected class training set meets the condition comprises: calculating a mean of a property for each of the plurality of sets; and determining the mean of each of the plurality of sets is within a predetermined range, a set is accepted only when the mean is within the predetermined range.

In Example 45, the subject matter of Example 44 optionally includes wherein the validating the selected class training set meets the condition comprises: calculating a standard deviation of a property for each of the plurality of sets; and determining the standard deviation of each of the plurality of sets is within a predetermined range, a set is accepted only when the standard deviation is within the predetermined range.

In Example 46, the subject flatter of any one or more of Examples 43-45 optionally include wherein each successive selected class training set comprises a previous selected class training set, and wherein each successive selected class training set is larger than the previous selected class training set.

In Example 47, the subject matter of any one or more of Examples 37-46 optionally include wherein the determining the size of the final selected class training set based upon the trained models comprises: determining a sensitivity value of each of the trained models; and determining a selected model with a smallest number of samples in the selected class training set where other models with larger select class training sets have a sensitivity that is not greater than some threshold, wherein the size of the finalize selected class training set is the size of the selected model.

In Example 48, the subject matter of Example 47 optionally includes wherein the determining the size of the final selected class training set comprises: creating a second plurality of selected class training sets, a size of each of the second plurality of selected class training sets determined from the size of the selected model; training a second model on each of the second selected class training sets and the all other classes training set; determining a second sensitivity value of each of the second trained models; and determining a second selected model with a smallest number of samples in the selected class training set where other models with larger select class training sets have a sensitivity that is not greater than some second threshold, wherein the size of the finalize selected class training set is the size of the second selected model.

Example 49 is at least one machine-readable medium including instructions, which when executed by a machine, cause the machine to perform operations of any of the methods of Examples 13-24.

Example 50 is an apparatus comprising means for performing any of the methods of Examples 13-24.

Example 51 is at least one machine-readable medium including instructions, which when executed by a machine, cause the machine to perform operations of any of the operations of Examples 1-24 or 37-48.

Example 52 is an apparatus comprising means for performing any of the operations of Examples 1-36.

Example 53 is a system to perform the operations of any of the Examples 1-48.

Example 54 is a method to perform the operations of any of Examples 1-12 or 25-48.

The above description is intended to be illustrative, and not restrictive. For example, the above-described examples (or one or more aspects thereof) may be used in combination with others. Other embodiments may be used, such as by one of ordinary skill in the art upon reviewing the above description. Further, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

The invention claimed is:

1. A system for selecting training set samples, the system comprising:
    processing circuitry to:
        divide an initial set of samples into a plurality of sets including at least a training universal set and a validation universal set, each sample comprising a plurality of properties and a class from a plurality of classes;
        validate each of the plurality of sets meet a condition;
        for each selected class in the plurality of classes:
            create a plurality of selected class training sets and an all other classes training set from the training universal set based upon the class of each sample;
            train a plurality of models, each model trained on one of the selected class training sets and the all other classes training set; and
            determine a size of a final selected class training set based upon the plurality of models; and
        provide a final training set that includes samples from each of the plurality of classes that includes for each class a number of samples based upon the size of the final selected class training set for each class.

2. The system of claim 1, wherein the plurality of sets comprise equal representation of each of the plurality of classes.

3. The system of claim 1, wherein to validate each of the plurality of sets meet the condition the processing circuitry:
    determines a mean of a property for each of the plurality of sets; and
    determines the mean of each of the plurality of sets is within a predetermined range, a set is accepted only when the mean is within the predetermined range.

4. The system of claim 3, wherein to validate each of the plurality of sets meet a condition the processing circuitry:
    determines a standard deviation of a property for each of the plurality of sets; and
    determines the standard deviation of each of the plurality of sets is within a predetermined range, a set is accepted only when the standard deviation is within the predetermined range.

5. The system of claim 4, wherein to validate each of the plurality of sets meet a condition the processing circuitry determines the samples in each of the plurality of sets each comprise samples of each type of a particular property from a plurality of genders.

6. The system of claim 1, wherein to divide an initial set of samples into the plurality of sets the processing circuitry:
    determines samples from a subject has a property value that is the same over all samples from the subject, the samples from the subject are only in one set of the plurality of sets.

7. The system of claim 1, wherein to create a plurality of selected class training sets the processing circuitry:
    randomly selects samples from the training universal set; and
    validates the selected class training set meets the condition.

8. The system of claim 7, wherein to validate the selected class training set meets the condition the processing circuitry:
    calculates a mean of a property for each of the plurality of sets; and
    determines the mean of each of the plurality of sets is within a predetermined range, a set s accepted only when the mean is within the predetermined range.

9. The system of claim 8, wherein to validate the selected class training set meets the condition the processing circuitry:
    calculates a standard deviation of property for each of the plurality of sets; and
    determines the standard deviation of each of the plurality of sets is within a predetermined range, a set is accepted only when the standard deviation is within the predetermined range.

10. The system of claim 7, wherein each successive selected class training set comprises a previous selected class training set, and wherein each successive selected class training set is larger than the previous selected class training set.

11. The system of claim 1, wherein to determine the size of the final selected class training set based upon the trained models the processing circuitry:
    determines a sensitivity value of each of the trained models; and
    determines a selected model with a smallest, number of samples in the selected class train set where other models with larger select class training sets have a sensitivity value that is not greater than some threshold, wherein the size of the final selected class training set is the size of the selected model.

12. The system of claim 11, wherein to determine the size of the final selected class training set the processing circuitry:
creates a second plurality of selected class training sets, the size of each of the second plurality of selected class training sets determined from the size of the selected model;
trains a second model on each of the second selected class training sets and the all other classes training set;
determines a second sensitivity value of each of the second trained models; and
determines a second selected model with a second smallest number of samples in the selected class training set where other models with larger select class training sets have a sensitivity value that is not greater than some second threshold, wherein the size of the final selected class training set is the size of the second selected model.

13. A method for selecting training set samples, the method comprising:
dividing an initial set of samples into a plurality of sets including at least a training universal set and a validation universal set, the initial set of samples comprising a plurality of samples, each sample comprising a plurality of properties and a class from a plurality of classes;
validating each of the plurality of sets meet a condition;
for each selected class in the plurality of classes:
creating a plurality of selected class training sets and an all other classes training set from the training universal set based upon the class of each sample, each of the selected class universal training set comprises samples from the selected class, and the all other classes training set comprises samples from classes that are not the selected class;
training a model on each of the selected class training sets and the all other classes training set; and
determining a size of a final selected class training set based upon the trained models; and
providing a final training set that includes samples from each of the plurality of classes that includes for each class a number of samples based upon the size of the final selected class training set for each class.

14. The method of claim 13, wherein the plurality of sets comprise equal representation of each of the plurality of classes.

15. The method of claim 13, wherein the validating each of the plurality of sets meet the condition comprises:
determining a mean of a property for each of the plurality of sets; and
determining the mean of each of the plurality of sets is within a predetermined range, a set is accepted only when the mean is within the predetermined range.

16. The method of claim 15, wherein to validate each of the plurality of sets meet the condition the processing circuitry:
determining a standard deviation of a property for each of the plurality of sets; and
determining the standard deviation of each of the plurality of sets is within a predetermined range, a set is accepted only when the standard deviation is within the predetermined range.

17. The method of claim 16, wherein the validating each of the plurality of sets meet the condition comprises determining the samples in each of the plurality of sets each comprise samples of each type of a particular property from a plurality of genders.

18. At least one non-transitory computer-readable medium, including instructions, which when executed by a machine, cause the machine to perform operations:
dividing an initial set of samples into a plurality of sets including at least a training universal set and a validation universal set, the initial set of samples comprising a plurality of samples, each sample comprising a plurality of properties and a class from a plurality of classes;
validating each of the plurality of sets meet a condition;
for each selected class in the plurality of classes:
creating a plurality of selected class training sets and an all other classes training set from the training universal set based upon the class of each sample, each of the selected class universal training set comprises samples from the selected class, and the all other classes training set comprises samples from classes that are not the selected class;
training a model on each of the selected class training sets and the all other classes training set; and
determining a size of a final selected class training set based upon the trained models; and
providing a final training set that includes samples from each of the plurality of classes that includes for each class a number of samples based upon the size of the final selected class training set for each class.

19. The at least one non-transitory computer-readable medium of claim 18, wherein the plurality of sets comprise equal representation of each of the plurality of classes.

20. The at least one non-transitory computer-readable medium of claim 18, wherein the validating each of the plurality of sets meet the condition comprises:
determining a mean of a property for each of the plurality of sets; and
determining the mean of each of the plurality of sets is within a predetermined range, a set is accepted only when the mean is within the predetermined range.

21. The at least one non-transitory computer-readable medium of claim 20, wherein to validate each of the plurality of sets meet the condition the processing circuitry:
determining a standard deviation of a property for each of the plurality of sets; and
determining the standard deviation of each of the plurality of sets is within a predetermined range, a set is accepted only when the standard deviation is within the predetermined range.

22. The at least one non-transitory computer-readable medium of claim 21, wherein the validating each of the plurality of sets meet the condition comprises determining the samples in each of the plurality of sets each comprise samples of each type of a particular property from a plurality of genders.

23. The at least one non-transitory computer-readable medium of claim 21, wherein the dividing an initial set of samples into plurality of sets comprises determining samples from a subject has a property value that is the same over all samples from the subject, the samples from the subject are only in one set of the plurality of sets.

24. The at least one non-transitory computer-readable medium of claim 21, wherein the creating a plurality of selected class training sets comprises:
randomly selecting samples from the training universal set; and validating the selected class training set meets the condition.

25. The at least one non-transitory computer-readable medium of claim 24, wherein the validating the selected class training set meets the condition comprises:
   calculating a mean of a property for each of the plurality of sets and determining the mean of each of the plurality of sets is within a predetermined range, a set is accepted only when the mean is within the predetermined range.

* * * * *

UNITED STATES PATENT AND TRADEMARK OFFICE
CERTIFICATE OF CORRECTION

PATENT NO. : 11,023,824 B2
APPLICATION NO. : 15/691632
DATED : June 1, 2021
INVENTOR(S) : Luis Sergio Kida Page 1 of 1

It is certified that error appears in the above-identified patent and that said Letters Patent is hereby corrected as shown below:

In the Claims

In Column 26, Line 43, in Claim 8, delete "s" and insert --is-- therefor

In Column 26, Line 48, in Claim 9, delete "of property" and insert --of a property-- therefor In Column 26, Line 64, in Claim 11, delete "smallest," and insert --smallest-- therefor In Column 26, Line 65, in Claim 11, delete "train" and insert --training-- therefor In Column 29, Line 7, in Claim 25, delete "sets" and insert --sets;-- therefor In Column 29, Line 7, in Claim 25, after "and", insert a linebreak Signed and Sealed this
Fourteenth Day of September, 2021

Drew Hirshfeld
*Performing the Functions and Duties of the*
*Under Secretary of Commerce for Intellectual Property and*
*Director of the United States Patent and Trademark Office*